United States Patent
Oh et al.

(10) Patent No.: US 9,866,812 B2
(45) Date of Patent: *Jan. 9, 2018

(54) VIDEO DATA PROCESSING METHOD AND DEVICE FOR DISPLAY ADAPTIVE VIDEO PLAYBACK

(71) Applicant: LG Electronics Inc., Seoul (KR)

(72) Inventors: Hyunmook Oh, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/490,940

(22) Filed: Apr. 19, 2017

(65) Prior Publication Data

US 2017/0223330 A1    Aug. 3, 2017

Related U.S. Application Data

(63) Continuation of application No. 14/716,411, filed on May 19, 2015, now Pat. No. 9,661,294.

(60) Provisional application No. 62/000,539, filed on May 20, 2014.

(51) Int. Cl.
| | |
|---|---|
| *H04N 9/87* | (2006.01) |
| *G06F 3/14* | (2006.01) |
| *H04N 5/775* | (2006.01) |
| *G09G 5/04* | (2006.01) |

(52) U.S. Cl.
CPC ............. *H04N 9/8722* (2013.01); *G06F 3/14* (2013.01); *G09G 5/04* (2013.01); *H04N 5/775* (2013.01); *G09G 2320/066* (2013.01); *G09G 2340/06* (2013.01); *G09G 2370/04* (2013.01)

(58) Field of Classification Search
CPC ................. H04N 5/775; H04N 9/8722; H04N 21/43632; H04N 21/4122; G06F 3/14
See application file for complete search history.

(56) References Cited

U.S. PATENT DOCUMENTS

| | | | |
|---|---|---|---|
| 9,661,294 B2 * | 5/2017 | Oh | ........................ H04N 9/8722 |
| 2014/0210847 A1 | 7/2014 | Knibbeler et al. | |

FOREIGN PATENT DOCUMENTS

| | | |
|---|---|---|
| WO | 2012166382 A2 | 12/2012 |
| WO | 2013046095 A1 | 4/2013 |
| WO | 2015118909 A1 | 8/2015 |

OTHER PUBLICATIONS

"CIE 15: 2004 3rd Edition" 2004, pp. 55-61 (Appendix B), ISBN: 3 901 906 33 9.
"CEA Standard CEA-861-E", Mar. 2008, pp. 33, 35, 48, 54, 55.

* cited by examiner

*Primary Examiner* — Huy T Nguyen
(74) *Attorney, Agent, or Firm* — Dentons US LLP

(57) ABSTRACT

A video data processing method and/device for display adaptive video playback are disclosed. The video data processing method includes receiving video data and dynamic range mastering information including dynamic range related information of the video data from a source device via an interface, and playing the received video data back. The dynamic range mastering information includes electro optical transfer function, EOTF, type information for identifying an EOTF used for the video data.

15 Claims, 31 Drawing Sheets

FIG. 4

| Offset | Value | | | | | | | | Description/Format |
|---|---|---|---|---|---|---|---|---|---|
| 0x00 | 0x14 | | | | | | | | HDR Data Block |
| 0x01 | 7 | 6 | 5 | 4 | 3 | 2 | 1 | 0 | BLOCK Revision and Other Data |
| | _ | _ | _ | _ | _ | 0 | 0 | 0 | REVISION 0 |
| | 0 | 0 | 0 | 0 | 0 | _ | _ | _ | RESERVED(BLOCK SPECIFIC) |
| 0x02 | | | | | | | | | Number Of Payload Bytes |
| 0x03 | Descriptor | | | | | | | | Control option flag |
| 0x04 0x05 | Descriptor | | | | | | | | Sink Device Dynamic Range |

FIG. 5

| Offset | Value | | | | | | | | Description/Format |
|---|---|---|---|---|---|---|---|---|---|
| 0x03 | 7 | 6 | 5 | 4 | 3 | 2 | 1 | 0 | Control Option Flag |
| | 1 | _ | _ | _ | _ | _ | _ | _ | Activate HDR processing in source device |
| | _ | 1 | _ | _ | _ | _ | _ | _ | Activate WCG processing in source device |
| | | | reserved | | | | | | Reserved |

FIG. 6

| Control option flag | description | Detailed description |
|---|---|---|
| 00000000 | No change | Source device does not perform any processing |
| 10000000 | Source device (HDR) | Source device performs only HDR |
| 01000000 | Source device (WCG) | Source device performs only WCG |
| 11000000 | Source device | Source device performs all processing based on delivered information (initial value) |

FIG. 7

| Offset | Value | | | | | | | | Description/Format |
|---|---|---|---|---|---|---|---|---|---|
| | 7 | 6 | 5 | 4 | 3 | 2 | 1 | 0 | Sink Device Dynamic Range |
| 0x04 | 0x00 -> 0xFF | | | | | | | | Lowest Brightness level of Sink device (higher 8 bits) |
| 0x05 | 1 | | | | | | | | Lowest Brightness level of Sink device (LSB) |
| | | 0x00 -> 0x3F | | | | | | | Highest Brightness level of Sink device (total 7 bits) |

FIG. 8

| Offset | Value | | | | | | | | Description/Format | |
|---|---|---|---|---|---|---|---|---|---|---|
| 00h | 00h | | | | | | | | Display Parameters Data Block | Tag |
| 01h | 7 | 6 | 5 | 4 | 3 | 2 | 1 | 0 | Block Revision and Other Data | |
| | - | - | - | - | - | 0 | 0 | 0 | Revision '0' | Values 0 — 7 |
| | 0 | 0 | 0 | 0 | 0 | - | - | - | Reserved | |
| 02h | 0Ch | | | | | | | | Number of Payload Bytes in Block | 12 |
| 03h 04h | Descriptor | | | | | | | | Horizontal image size | |
| 05h 06h | Descriptor | | | | | | | | Vertical image size | |
| 07h 08h | Descriptor | | | | | | | | Horizontal pixel count | |
| 09h 0Ah | Descriptor | | | | | | | | Vertical pixel count | |
| 0Bh | Descriptor | | | | | | | | Feature Support Flags | |
| 0Ch | Descriptor | | | | | | | | Transfer Characteristic Gamma | |
| 0Dh | Descriptor | | | | | | | | Aspect Ratio | |
| 0Eh | Descriptor | | | | | | | | Color Bit Depth | |

| Offset | Value | | | | | | | | Description/Format |
|---|---|---|---|---|---|---|---|---|---|
| 0x0F | 7 | 6 | 5 | 4 | 3 | 2 | 1 | 0 | Control Option Flag |
| | 1 | - | - | - | - | - | - | - | Activate HDR processing in source device |
| | - | 1 | - | - | - | - | - | - | Activate WCG processing in source device |
| | - | - | reserved | | | | | | Reserved |
| | 7 | 6 | 5 | 4 | 3 | 2 | 1 | 0 | Sink Device Dynamic Range |
| 0x10 | 0x00 -> 0xFF | | | | | | | | Lowest Brightness level of Sink device (higher 8 bits) |
| 0x11 | 1 | - | - | - | - | - | - | - | Lowest Brightness level of Sink device (LSB) |
| | - | 0x00 -> 0x3F | | | | | | | Highest Brightness level of Sink device (total 7 bits) |

FIG. 9

| Offset | Value | Description/Format |
|---|---|---|
| 00h | 0Ch | DISPLAY DEVICE DATA BLOCK                                    TAG |
| 01h | 7 6 5 4 3 2 1 0 | BLOCK Revision and Other Data |
|  | _ _ _ _ 0 0 0 | REVISION '0'                                   VALUES 0 → 7 |
|  | 0 0 0 0 0 _ _ _ | RESERVED |
| 02h | 0Dh | Number of Payload Bytes in BLOCK                              13 |
| 03h | DESCRIPTOR | Display Device Technology |
| 04h | DESCRIPTOR | Device operating mode |
| 05h → 08h | DESCRIPTOR | Devoce native pixel format |
| 09h → 0Ah | DESCRIPTOR | Aspect ratio and orientation |
| 0Bh | DESCRIPTOR | Sub-pixel layout / configuration / shape |
| 0Ch → 0Dh | DESCRIPTOR | Horizontal and vertical dot / pixel pitch |
| 0Eh | DESCRIPTOR | Color bit depth |
| 0Fh | DESCRIPTOR | Response time |

| Offset | Value | Description/Format |
|---|---|---|
| 0x0F | 7 6 5 4 3 2 1 0 | Control Option Flag |
|  | 1 _ _ _ _ _ _ _ | Activate HDR processing in source device |
|  | _ 1 _ _ _ _ _ _ | Activate WCG processing in source device |
|  | reserved | Reserved |
|  | 7 6 5 4 3 2 1 0 | Sink Device Dynamic Range |
| 0x10 | 0x00 -> 0xFF | Lowest Brightness level of Sink device (higher 8 bits) |
| 0x11 | 1 _ _ _ _ _ _ _ | Lowest Brightness level of Sink device (LSB) |
|  | 0x00 -> 0x3F | Highest Brightness level of Sink device (total 7 bits) |

FIG. 10

| | Byte# | Bits 5-7 | Bits 0-4 |
|---|---|---|---|
| Video Data Block | 1 | Video Tag Code | length = total number of video bytes following this byte ($L_1$) |
| | 2 | CEA Short Video Descriptor 1 | |
| | 3 | CEA Short Video Descriptor 2 | |
| | ... | ... | |
| | $1+L_1$ | CEA Short Video Descriptor $L_1$ | |
| Audio Data Block | $2+L_1$ | Audio Tag Code | length = total number of audio bytes following this byte ($L_2$) |
| | $3+L_1$ | CEA Short Audio Descriptor 1 | |
| | $4+L_1$ | | |
| | $5+L_1$ | | |
| | ... | | |
| | $L_1+L_2$ | | |
| | $1+L_1+L_2$ | CEA Short Audio Descriptor $L_2$/3 | |
| | $2+L_1+L_2$ | | |
| Speaker Allocation Data Block | $3+L_1+L_2$ | Speaker Allocation Tag Code | length = total number of Speaker Allocation bytes following this byte ($L_3 = 3$) |
| | $4+L_1+L_2$ | Speaker Allocation Data Block Payload (3 bytes) | |
| | $5+L_1+L_2$ | | |
| | $6+L_1+L_2$ | | |
| Vendor-Specific Data Block | $7+L_1+L_2$ | Vendor-Specific Tag Code | length = total number of Vendor-Specific bytes following this byte ($L_4$) |
| | $8+L_1+L_2$ | IEEE OUI third two hex digits | |
| | $9+L_1+L_2$ | IEEE OUI second two hex digits | |
| | $10+L_1+L_2$ | IEEE OUI first two hex digits | |
| | ... | Vendor-Specific Data Block Payload ($L_4$-3 bytes) | |
| Video Capability Data Block | $8+L_1+L_2+L_4$ | Extended Tag Code | length = total number of bytes in this block following this byte ($L_5$) |
| | $9+L_1+L_2+L_4$ | Video Capabilities Ext. Tag Code = 00h | |
| | $10+L_1+L_2+L_4$ | Video Capabilities Data Bye 3 (see Section 7.5.6) | |
| Dynamic Range | $11+L_1+L_2+L_4+L_5$ | Dynamic range Tag Code | length = total number of bytes in this block following this byte ($L_6 = 3$) |
| | $12+L_1+L_2+L_4+L_5$ | Lowest Brightness level of Sink device (higher 8 bits) | |
| | $13+L_1+L_2+L_4+L_5$ | Lowest Brightness level of Sink device (LSB) | |
| | $14+L_1+L_2+L_4+L_5$ | Highest Brightness level of Sink device (total 7 bits) | |

FIG. 11

| InfoFrame Type Code | InfoFrame Type = 0x07 (UHDInfoFrame) | | | | | | | |
|---|---|---|---|---|---|---|---|---|
| InfoFrame Version Number | Version = 0x00 | | | | | | | |
| Length of HDRInfoFrame | Length of HDRInfoFrame () | | | | | | | |
| Data Byte 1 | P3 | P2 | P1 | P0 | R2 | R1 | R0 | E0 |
| Data Byte 2 | black_luminance_level (highest 8 bits) | | | | | | | |
| Data Byte 3 | black_lu minance level (lower 1 bit) | white_luminance_level (7 bits) | | | | | | |
| Data Byte 4 | Orig_black_luminance_level (highest 8 bits) | | | | | | | |
| Data Byte 5 | Orig_bla ck_lumi nance_l evel (lower 1 bit) | Orig_white_luminance_level (7 bits) | | | | | | |
| Data Byte 6 | Orig_color_gamut | | | S3 | S2 | S1 | S0 | |
| Data Byte 7 | Red-x low bits | | Red-y low bits | | Green-x low bits | | Green-y low bits | |
| Data Byte 8 | Blue-x low bits | | Blue-y low bits | | White-x low bits | | White-y low bits | |
| Data Byte 9 | Red-x high bits | | | | | | | |
| Data Byte 10 | Red-y high bits | | | | | | | |
| Data Byte 11 | Green-x high bits | | | | | | | |
| Data Byte 12 | Green-y high bits | | | | | | | |
| Data Byte 13 | Blue-x high bits | | | | | | | |
| Data Byte 14 | Blue-y high bits | | | | | | | |
| Data Byte 15 | White-x high bits | | | | | | | |
| Data Byte 16 | White-y high bits | | | | | | | |
| Data Byte 17 | E3 | E2 | E1 | E0 | Number of Coefficients | | | |
| Data Byte 18 | EOTF_additional_info | | | | | | | |
| Data Byte (18+1) | EOTF_Coefficient 1 | | | | | | | |
| Data Byte (18+2) | EOTF_Coefficient 2 | | | | | | | |
| ... | ... | | | | | | | |
| Data Byte (18+N) | EOTF_Coefficient N | | | | | | | |

FIG. 12

| post_processing_type | description | Detailed description |
|---|---|---|
| 0000 | No change | Source device does not perform any processing |
| 0001 | Dynamic Range mapping | Dynamic range mapping is performed |
| 0010 | Gamut mapping | Gamut mapping is performed |
| 0011 | Source device | Source device performs all processing based on information delivered by sink device |
| 0011-1000 | reserved | These may be used for information exchange between sink and source devices in the future, for ftc and multilayer video enhancement function |
| 1001-1111 | User private | |
| 1111 | Different contents gamut | Original color gamut is used to distinguishably signal contents color gamut and container color gamut |

FIG. 13

| Orig_color_gamut | description |
|---|---|
| 0000 | REC. 709 |
| 0001 | BT. 2020 NCL |
| 0010 | xvYCC |
| 0011 | DCI-P3 |
| 0100 | Adobe RGB |
| 0101 | BT. 2020 CL |
| 0110 ~ 1111 | reserved |

FIG. 14

| | | | | | | | | |
|---|---|---|---|---|---|---|---|---|
| InfoFrame Type Code | \multicolumn{8}{l|}{InfoFrame Type = 0×02} |
| InfoFrame Version Number | \multicolumn{8}{l|}{Version = 0×02 or [0×03]} |
| Length of AVI InfoFrame | \multicolumn{8}{l|}{Length of AVI InfoFrame (16)} |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | VQ1 | VQ2 | CN1 | CN0 | PR3 | PR2 | PR1 | PR0 |
| Data Byte 6 | \multicolumn{8}{l|}{ETB07-ETB00 (Line Number of End of Top Bar - lower 8 bits)} |
| Data Byte 7 | \multicolumn{8}{l|}{ETB15-ETB08 (Line Number of End of Top Bar - upper 8 bits)} |
| Data Byte 8 | \multicolumn{8}{l|}{SBB07-SBB00 (Line Number of Start of Bottom Bar - lower 8 bits)} |
| Data Byte 9 | \multicolumn{8}{l|}{SBB15-SBB08 (Line Number of Start of Bottom Bar - upper 8 bits)} |
| Data Byte 10 | \multicolumn{8}{l|}{ELB07-ELB00 (Pixel Number of End of Left Bar - lower 8 bits)} |
| Data Byte 11 | \multicolumn{8}{l|}{ELB15-ELB08 (Pixel Number of End of Left Bar - upper 8 bits)} |
| Data Byte 12 | \multicolumn{8}{l|}{SRB07-SBB00 (Pixel Number of Start of Right Bar - lower 8 bits)} |
| Data Byte 13 | \multicolumn{8}{l|}{SRB15-SBB08 (Pixel Number of Start of Right Bar - upper 8 bits)} |
| Data Byte 14 | P3 | P2 | P1 | P0 | R2 | R1 | R0 | E0 |
| Data Byte 15 | \multicolumn{8}{l|}{black_luminance_level (highest 8 bits)} |
| Data Byte 16 | black_luminance_level(lower 1 bit) | \multicolumn{7}{l|}{white_luminance_level (7 bits)} |
| Data Byte 17 | \multicolumn{8}{l|}{Orig_black_luminance_level (highest 8 bits)} |
| Data Byte 18 | Orig_black_luminance_level(lower1 bit) | \multicolumn{7}{l|}{Orig_white_luminance_level (7 bits)} |
| Data Byte 19 | \multicolumn{4}{l|}{Orig_color_gamut} | S3 | S2 | S1 | S0 |
| Data Byte 20 | \multicolumn{2}{l|}{Red-x low bits} | \multicolumn{2}{l|}{Red-y low bits} | \multicolumn{2}{l|}{Green-x low bits} | \multicolumn{2}{l|}{Green-y low bits} |
| Data Byte 21 | \multicolumn{2}{l|}{Blue-x low bits} | \multicolumn{2}{l|}{Blue-y low bits} | \multicolumn{2}{l|}{White-x low bits} | \multicolumn{2}{l|}{White-y low bits} |
| Data Byte 22 | \multicolumn{8}{l|}{Red-x high bits} |
| Data Byte 23 | \multicolumn{8}{l|}{Red-y high bits} |
| Data Byte 24 | \multicolumn{8}{l|}{Green-x high bits} |
| Data Byte 25 | \multicolumn{8}{l|}{Green-y high bits} |
| Data Byte 26 | \multicolumn{8}{l|}{Blue-x high bits} |
| Data Byte 27 | \multicolumn{8}{l|}{Blue-y high bits} |
| Data Byte 28 | \multicolumn{8}{l|}{White-x high bits} |
| Data Byte 29 | \multicolumn{8}{l|}{White-y high bits} |
| Data Byte 30 | E3 | E2 | E1 | E0 | \multicolumn{4}{l|}{Number of Coefficients} |
| Data Byte 31 | \multicolumn{8}{l|}{EOTF_additional_info} |
| Data Byte (31+1) | \multicolumn{8}{l|}{EOTF_Coefficient 1} |
| Data Byte (31+2) | \multicolumn{8}{l|}{EOTF_Coefficient 2} |
| ... | \multicolumn{8}{l|}{...} |
| Data Byte (31+N) | \multicolumn{8}{l|}{EOTF_Coefficient N} |

FIG. 16

| EOTF type | description |
|---|---|
| 000 | Reserved |
| 001 | EOTF_type1 |
| 010 | EOTF_type2 |
| 011-111 | User Private |

FIG. 19

| InfoFrame Type Code | InfoFrame Type = 0×02 | | | | | | |
|---|---|---|---|---|---|---|---|
| InfoFrame Version Number | Version = 0×02 or [0×03] | | | | | | |
| Length of AVI InfoFrame | Length of AVI InfoFrame (13) | | | | | | |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | VQ1 | VQ2 | CN1 | CN0 | PR3 | PR2 | PR1 | PR0 |
| Data Byte 6 | ETB07-ETB00 (Line Number of End of Top Bar - lower 8 bits) | | | | | | |
| Data Byte 7 | ETB15-ETB08 (Line Number of End of Top Bar - upper 8 bits) | | | | | | |
| Data Byte 8 | SBB07-SBB00 (Line Number of Start of Bottom Bar - lower 8 bits) | | | | | | |
| Data Byte 9 | SBB15-SBB08 (Line Number of Start of Bottom Bar - upper 8 bits) | | | | | | |
| Data Byte 10 | ELB07-ELB00 (Pixel Number of End of Left Bar - lower 8 bits) | | | | | | |
| Data Byte 11 | ELB15-ELB08 (Pixel Number of End of Left Bar - upper 8 bits) | | | | | | |
| Data Byte 12 | SRB07-SBB00 (Pixel Number of Start of Right Bar - lower 8 bits) | | | | | | |
| Data Byte 13 | SRB15-SBB08 (Pixel Number of Start of Right Bar - upper 8 bits) | | | | | | |
| Data Byte 14 | | | | | | CE2 | CE1 | CE0 |

| C1 | C0 | Colorimetry |
|---|---|---|
| 0 | 0 | No Data |
| 0 | 1 | SMPTE 179M [1] |
| 1 | 0 | ITU-R BT 709[7] |
| 1 | 1 | SMPTE 179M Extended Colorimetry Information Valid (colorimetry indicated in bits EC0, EC1, and EC2. See Table 12) |

| EC2 | EC1 | EC0 | Extended Colorimetry |
|---|---|---|---|
| 0 | 0 | 0 | xvYCC$_{601}$ |
| 0 | 0 | 1 | xvYCC$_{709}$ |
| 0 | 1 | 0 | sYCC$_{601}$ |
| 0 | 1 | 1 | Adobe$_{YCC601}$ |
| 1 | 0 | 0 | Adobe$_{RGB}$ |
| 1 | 0 | 1 | ITU-R BT.2020 Y'$_C$C'$_{BC}$C'$_{RC}$ |
| 1 | 1 | 0 | ITU-R BT.2020 R'G'B' or Y'C'$_B$C'$_R$ |
| 1 | 1 | 1 | Reserved |

| EC2 | EC1 | EC0 | Colorimetry Extension |
|---|---|---|---|
| 0 | 0 | 0 | Unspecified colorimetry |
| 0 | 0 | 1 | DCI-P3 |

| EC2 | EC1 | EC0 | Extended Colorimetry |
|---|---|---|---|
| 1 | 1 | 1 | Colorimetry Extension Valid |

FIG. 20

| Offset | Value | | | | | | | | Description/Format |
|---|---|---|---|---|---|---|---|---|---|
| 0x00 | 0x14 | | | | | | | | HDR Data Block |
| 0x01 | 7 | 6 | 5 | 4 | 3 | 2 | 1 | 0 | BLOCK Revision and Other Data |
|  |  |  |  |  |  | 0 | 0 | 0 | REVISION '0' |
|  | 0 | 0 | 0 | 0 | 0 |  |  |  | RESERVED (BLOCK SPECIFIC) |
| 0x02 | | | | | | | | | Number Of Payload Bytes |
| 0x03 | Descriptor | | | | | | | | Control option flag |
| 0x04<br>0x05 | Descriptor | | | | | | | | Sink Device Dynamic Range |
| 0x06 | Descriptor | | | | | | | | Transfer Function Type flag |
| 0x07 ~<br>0x0A | Descriptor | | | | | | | | Unspecified TF details |
| 0x0B~ | Descriptor | | | | | | | | Unspecified TF coefficients<br>(TF_coefficient 1 ... TF_coefficient N) |

FIG. 21

| Offset | Value | | | | | | | | Description/Format |
|---|---|---|---|---|---|---|---|---|---|
| 0x06 | 7 | 6 | 5 | 4 | 3 | 2 | 1 | 0 | Transfer Function Type flag |
| | 1 | _ | _ | _ | _ | _ | _ | _ | Unspecified Transfer Function |
| | _ | 1 | _ | _ | _ | _ | _ | _ | BT.1886 |
| | _ | _ | 1 | _ | _ | _ | _ | _ | SMPTE ST 2084 |
| | _ | _ | _ | Reserved | | | | | reserved |
| | 7 | 6 | 5 | 4 | 3 | 2 | 1 | 0 | Unspecified TF Details |
| 0x07 | 0x0 -> 0xF | | | | _ | _ | _ | _ | Type of Unspecified Transfer Function |
| | _ | _ | _ | _ | 0x0 -> 0xF | | | | Number of coefficients in Unspecified Transfer Function |
| 0x08 | 0~3 | | _ | _ | _ | _ | _ | _ | Number of types |
| | _ | _ | 0~3 | | _ | _ | _ | _ | Bitdepth |
| | _ | _ | _ | _ | Reserved | | | | reserved |
| 0x09 | 0x00 -> 0xFF | | | | | | | | Lowest Brightness level of Sink device (higher 8 bits) |
| 0x0A | 1 | _ | _ | _ | _ | _ | _ | _ | Lowest Brightness level of Sink device (LSB) |
| | _ | 0x00 -> 0x3F | | | | | | | Highest Brightness level of Sink device (total 7 bits) |
| | 7 | 6 | 5 | 4 | 3 | 2 | 1 | 0 | Unspecified TF coefficients |
| 0x0B | 0x00 -> 0xFF | | | | | | | | TF_coefficient 1 |
| ... | ... | | | | | | | | ... |
| | 0x00 -> 0xFF | | | | | | | | TF_coefficient N |

FIG. 23
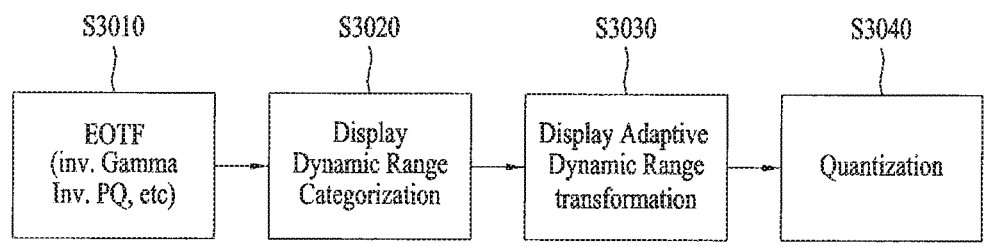
FIG. 24
```
S3010          S3020              S3030              S3040
  |              |                  |                  |
EOTF         Display          Display Adaptive
(inv. Gamma  Dynamic Range    Dynamic Range  ----> Quantization
Inv. PQ, etc) Categorization   transformation
```
FIG. 25
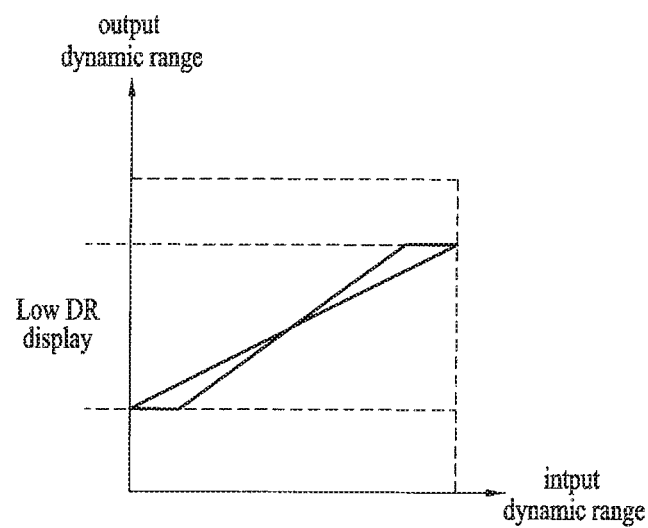

FIG. 28

| sei_payload( payloadType, payloadSize ) { | Category | Descriptor |
|---|---|---|
| ... | | |
| if( payloadType == 53 ) | | |
|    Dynamic_range_transformation_info(payloadSize) | 5 | |

FIG. 29

| Dynamic_range_transformation_info(payloadSize) { | C | Descriptor |
|---|---|---|
|     luminance_max | | |
|     luminance_min | | |
|     private_EOTF | | |
|     if(private_EOTF == 1){ | | |
|         number_of_coeff | | |
|         for(i=0; i<number_of_coeff; i++) | | |
|             transfer_curve_coeff[i] | | |
|     } | | |
|     clipping_flag | | |
|     linear_mapping_flag | | |
|     if(clipping_flag == 1) { | | |
|         luma_clipping_upper_bound | | |
|         luma_clipping_lower_bound | | |
|     } | | |
|     luminance_upper_bound | | |
|     luminance_lower_bound | | |
|     luma_upper_value | | |
|     luma_lower_value | | |
|     mid_DR_transformation_curve_type | | |
|     mid_DR_transformation_curve() | | |
|     mid_DR_percentage | | |
|     upper_DR_transformation_curve_type | | |
|     upper_DR_transformation_curve() | | |
|     upper_DR_percentage | | |
|     lower_DR_transformation_curve_type | | |
|     lower_DR_transformation_curve() | | |
|     number_luminance_upper_bound_diff | | |
|     for(i=0; number_luminance_upper_bound_diff; i++) { | | |
|         luminance_upper_bound_diff[i] | | |
|         luma_upper_value_diff[i] | | |
|         upper_DR_transformation_curve_type[i] | | |
|         upper_DR_transformation_curve() | | |
|         upper_DR_percentage[i] | | |
|         mid_DR_percentage[i] | | |
|     } | | |

FIG. 30

| mid_DR_transformation_curve_type | Description |
|---|---|
| 0x00 | Linear function |
| 0x01 | Logarithmic function |
| 0x02 | Exponential function |
| 0x03 | S-curve |
| 0x04 | combination |
| 0x05 | Look-up table |
| 0x06 ~ 0xFF | Reserved |

FIG. 31

| Syntax | No. of bits | Format |
|---|---|---|
| DR_transformation_curve ( ) { | | |
|   if (DR_transformation_curve_type=='0x00') { | | |
|     gradient | | uimsbf |
|   } | | |
|   else if (DR_transformation_curve_type=='0x01') { | | |
|     coeff_a | | uimsbf |
|   } | | |
|   else if (DR_transformation_curve_type=='0x02') { | | |
|     coeff_a | | uimsbf |
|   } | | |
|   else if (DR_transformation_curve_type=='0x03') { | | |
|     intersection_x | | uimsbf |
|     coeff_a1 | | uimsbf |
|     coeff_a2 | | uimsbf |
|   } | | |
|   else if (DR_transformation_curve_type=='0x04') { | | |
|     number_section | | uimsbf |
|     for(i=0; number_section; i++){ | | |
|       intersection_x[i] | | uimsbf |
|       DR_transformation_curve_type[i] | | uimsbf |
|       if (DR_transformation_curve_type=='0x00') { | | |
|         gradient[i] | | uimsbf |
|       } | | |
|       else if (DR_transformation_curve_type=='0x01') { | | |
|         coeff_a[i] | | uimsbf |
|       } | | |
|       else if (DR_transformation_curve_type=='0x02') { | | |
|         coeff_a[i] | | uimsbf |
|       } | | |
|   else if (DR_transformation_curve_type=='0x05') { | | |
|     entry_length | | uimsbf |
|     for (i=0; i<entry_length; i++) { | | |
|       in_value | | uimsbf |
|       out_value | | uimsbf |
|     } | | |
|   } | | |
| } | | |

FIG. 32

| Syntax | No. of Bits | Format |
|---|---|---|
| event_informaion_table_section() { | | |
|     table_id | 8 | 0xCB |
|     section_syntax_indicator | 1 | '1' |
|     pricate_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j=0; j<num_events_in_section; j++_ { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i=0; i<N; i++) { | | |
|             descriptor() | | |
|         } | | |
|     } | | |
|     CRC_32 | 32 | rpchof |
| } | | |

FIG. 33

| Syntax | No. of bits | Format |
|---|---|---|
| dynamic_range_transformation_info_descriptor ( ) { | | |
|     descriptor_tag | 8 | uimsbf |
|     descriptor_length | 8 | uimsbf |
|     reserved | 4 | |
|     number_of_HDR_info | 4 | |
|     for(i=0; i<number_of_color_info; i++) { | | |
|         dynamic_range_transformation_metadata () | | |
|     } | | |
| } | | |

FIG. 34

| dynamic_range_transformation_metadata () { | No. of bits | Format |
|---|---|---|
|     luminance_max | | |
|     luminance_min | | |
|     luminance_upper_bound | | |
|     luminance_lower_bound | | |
|     number_luminance_upper_bound_diff | | |
|     for(i=0; number_luminance_upper_bound_diff; i++) { | | |
|         luminance_upper_bound_diff[i] | | |
|     } | | |
| } | | |

FIG. 35

| Syntax | No. of bits | Format |
|---|---|---|
| UHD_program_info_descriptor ( ) { | | |
|     descriptor_tag | 8 | uimsbf |
|     descriptor_length | 8 | uimsbf |
|     UHD_service_type | 4 | uimsbf |
|     Reserved | 4 | |
| } | | |

FIG. 36

| UHD_service_type | Example of usage |
|---|---|
| 0000 | UHD1 |
| 0001 | UHD2 |
| 0010-0111 | Reserved |
| 1000-1111 | User_private |

FIG. 37

| Syntax | No. of Bits | Format |
|---|---|---|
| terrestrial_virtual_channel_table_section() { | | |
|     table_id | 8 | 0xCB |
|     section_syntax_indicator | 1 | '1' |
|     pricate_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_channels_in_section | 8 | uimsbf |
|     for (j=0; i<num_channels_in_section; i++_ { | | |
|         short_name | 7*16 | '11' |
|         reserved | 4 | uimsbf |
|         major_channel_number | 10 | uimsbf |
|         minor_channel_number | 10 | '11' |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i=0; i<N; i++) { | | |
|             descriptor() | | |
|         } | | |
|     } | | |

FIG. 38

| Service scenario | service_type | Descriptors |
|---|---|---|
| UHD | 0x07 | Component list descriptor<br>Service location descriptor<br>UHD descriptor |
| | 0x09 | Component list descriptor<br>Parameterized service descriptor<br>Service location descriptor |
| | 0x10 | UHD descriptor<br>Service location descriptor |

VIDEO DATA PROCESSING METHOD AND DEVICE FOR DISPLAY ADAPTIVE VIDEO PLAYBACK

This application is a continuation of U.S. application Ser. No. 14/716,411, filed on May 19, 2015, and claims priority to and the benefit of U.S. Provisional Application No. 62/000,539, filed May 20, 2014, all of which are hereby incorporated by reference for all purposes as if fully set forth herein in their entireties.

BACKGROUND OF THE INVENTION

Field of the Invention

The present invention relates to processing of video data and, more particularly, to a video data processing method and device for display adaptive video playback.

Discussion of the Related Art

As a video signal processing rate has increased, research into a method for encoding/decoding ultra high definition (UHD) video has been conducted.

UHD content is aimed at providing improved image quality as compared to existing content. Research into and development of a UHD video element have been conducted in various fields in addition to a broadcast field. A demand for providing an improved user experience, which has not been provided by existing content in terms of color and brightness, has increased.

Therefore, efforts to increase the ranges of color and brightness among various elements configuring UHD video to provide a high-quality image have been continuously made.

A UHD display device is different from an existing display device in terms of improvement of color and brightness.

However, under various display device conditions, technology for optimally viewing UHD content has not been developed.

For example, if UHD content is supplied via a next-generation display device, the color or brightness of an image may be restricted according to the physical properties of a display device and thus content may not be appropriately displayed.

In order to adaptively control the color and brightness of content according to display device, content transformation should be performed based on accurate analysis of the properties of the display device. However, if UHD content is supplied via an external device, delivery of the properties of the display device may be restricted.

SUMMARY OF THE INVENTION

Accordingly, the present invention is directed a video data processing method and device for display adaptive video playback that substantially obviate one or more problems due to limitations and disadvantages of the related art.

An object of the present invention is to provide a video processing method and a video processing device capable of allowing a viewer to optimally view content including UHD content under various display device conditions.

Another object of the present invention devised is to provide a video processing method and a video processing device capable of reducing color or brightness restrictions according to the physical properties of display devices when content including UHD content is displayed on various display devices.

A further object of the present invention is to provide a video processing method and a video processing device capable of allowing a viewer to optimally view content including UHD content by delivering the properties of a display device even when content including the UHD content is supplied via an external device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video data processing method includes receiving video data and dynamic range mastering information including dynamic range related information of the video data from a source device via an interface, the dynamic range mastering information including electro optical transfer function (EOTF) type information for identifying an EOTF used for the video data, and playing the received video data back.

Preferably, the dynamic range mastering information includes information indicating maximum brightness of a mastering display and information indicating minimum brightness of the mastering display.

Preferably, the dynamic range mastering information includes chromaticity coordinate information of three primary colors and white color of a mastering display.

Preferably, the dynamic range mastering information includes additional information of the EOTF according to the EOTF type information.

In other aspect of the present invention, a video data processing device includes a reception unit configured to receive video data and dynamic range mastering information including dynamic range related information of the video data from a source device via an interface, the dynamic range mastering information including electro optical transfer function (EOTF) type information for identifying an EOTF used for the video data, and a playback unit configured to play the received video data back.

Preferably, the dynamic range mastering information includes information indicating maximum brightness of a mastering display and information indicating minimum brightness of the mastering display.

Preferably, the dynamic range mastering information includes chromaticity coordinate information of three primary colors and white color of a mastering display.

Preferably, the dynamic range mastering information includes additional information of the EOTF according to the EOTF type information.

In other aspect of the present invention, a video data processing method includes decoding video data, and transmitting the decoded video data and dynamic range mastering information including dynamic range related information of the video data to a sink device via an interface, wherein the dynamic range mastering information includes electro optical transfer function (EOTF) type information for identifying an EOTF used for the video data.

Preferably, the dynamic range mastering information includes information indicating maximum brightness of a mastering display and information indicating minimum brightness of the mastering display.

Preferably, the dynamic range mastering information includes chromaticity coordinate information of three primary colors and white color of a mastering display.

Preferably, the dynamic range mastering information includes additional information of the EOTF according to the EOTF type information.

In other aspect of the present invention, a video data processing device includes a decoder configured to decode video data, and a transmission unit configured to transmit the decoded video data and dynamic range mastering information including dynamic range related information of the video data to a sink device via an interface, wherein the dynamic range mastering information includes electro optical transfer function (EOTF) type information for identifying an EOTF used for the video data.

Preferably, the dynamic range mastering information includes information indicating maximum brightness of a mastering display and information indicating minimum brightness of the mastering display.

Preferably, the dynamic range mastering information includes chromaticity coordinate information of three primary colors and white color of a mastering display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram showing an example of information delivered from the sink device to the source device according to an embodiment of the present invention.

FIG. 5 is a diagram showing a detailed field value of the above-described embodiment as an example of information delivered from the sink device to the source device according to an embodiment of the present invention.

FIG. 6 is a diagram showing a detailed example of a control option flag according to an embodiment of the present invention.

FIG. 7 is a diagram showing a detailed example of sink device dynamic range information according to an embodiment of the present invention.

FIG. 8 is a diagram showing a display parameters data block of a DisplayID as the display related information transmitted from the sink device to the source device according to an embodiment of the present invention.

FIG. 9 is a diagram showing a display device data block as the display related information described in an embodiment of the present invention.

FIG. 10 is a diagram showing another example of delivering the display related information from the sink device to the source device according to one embodiment of the present invention.

FIG. 11 is a diagram showing information to be delivered from the source device to the sink device according to an embodiment of the present invention.

FIG. 12 is a diagram showing a detailed example of post processing type information disclosed according to an embodiment of the present invention.

FIG. 13 is a diagram showing a detailed example of original color gamut information Orig_color_gamut according to an embodiment of the present invention.

FIG. 14 is a diagram showing another example of delivering video color information from the source device to the sink device according to an embodiment of the present invention.

FIG. 16 is a diagram showing the configuration of an EOTF type according to one embodiment of the present invention.

FIG. 19 is a diagram showing a method of signaling a DCI-P3 color gamut according to another embodiment of the present invention.

FIG. 20 is a diagram showing information on a transfer function which may be processed by the sink device according to one embodiment of the present invention.

FIG. 21 is a diagram showing detailed field values used in a method of delivering information on a transfer function which may be processed by the sink device according to one embodiment of the present invention.

FIG. 23 is a diagram showing a criterion for categorizing the display characteristics of the reception device according to one embodiment of the present invention.

FIG. 24 is a diagram showing a video processing procedure of UHD broadcast content according to one embodiment of the present invention.

FIG. 25 is a diagram showing a clipping option and a linear dynamic range transformation method according to one embodiment of the present invention.

FIG. 28 is a diagram showing the structure of a supplemental enhancement information (SEI) message according to one embodiment of the present invention.

FIG. 29 is a diagram showing high dynamic range transformation info(payloadSize) included and transmitted in an SEI message according to one embodiment of the present invention.

FIG. 30 is a diagram showing mid area transformation curve type information mid_DR_transformation_curve_ype according to one embodiment of the present invention.

FIG. 31 is a diagram showing transformation curve detailed information DR_transformation_curve according to one embodiment of the present invention.

FIG. 32 is a diagram showing an event information table according to one embodiment of the present invention.

FIG. 33 is a diagram showing a dynamic range transformation information descriptor dynamic_range_transformation_info_descriptor according to one embodiment of the present invention.

FIG. 34 is a diagram showing HDR metadata dynamic_range_transformation_metadata( ) included in the dynamic range transformation information descriptor dynamic_range_transformation_info_descriptor( ) according to one embodiment of the present invention.

FIG. 35 is a diagram showing a UHD program information descriptor UHD_program_info_descriptor( ) according to one embodiment of the present invention.

FIG. 36 is a diagram showing a UHD_service_type field included in the UHD program information descriptor UHD_program_info_descriptor( ) according to one embodiment of the present invention.

FIG. 37 is a diagram showing a terrestrial virtual channel table (TVCT) according to one embodiment of the present invention.

FIG. 38 is a diagram showing a descriptor capable of identifying a UHD broadcast service according to one embodiment of the present invention.

DETAILED DESCRIPTION OF THE INVENTION

Reference will now be made in detail to the preferred embodiments of the present invention, examples of which are illustrated in the accompanying drawings. However, the invention should not be limited to the specific embodiments described herein.

Although the terms used in the present invention are selected from generally known and used terms, terms used herein may vary depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

Figure 1:
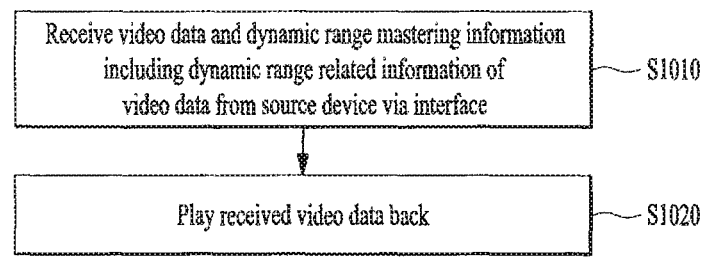
FIG. 1 is a diagram showing a video data processing method according to one embodiment of the present invention.

FIG. 1 is a diagram showing a video data processing method according to one embodiment of the present invention.

The video data processing method according to one embodiment of the present invention may include step S1010 of receiving video data and dynamic range mastering information including dynamic range related information of the video data from a source device via an interface and/or step S1020 of playing the received video data back. Here, the dynamic range mastering information may include electro optical transfer function (EOTE) type information for identifying an EOTF used in the video data. The dynamic range mastering information will be described in detail below with reference to FIGS. 11, 12 and 14.

According to another embodiment of the present invention, the dynamic range mastering information may include information indicating maximum brightness of a mastering display and/or minimum brightness of the mastering display. Here, the information indicating maximum brightness of the mastering display may indicate Orig_white_luminance_level information and the information indicating minimum brightness of the mastering display may indicate Orig_black_luminance_level. These will be described in detail below with reference to FIGS. 11, 12 and 14.

According to another embodiment of the present invention, the dynamic range mastering information may include chromaticity coordinate information of three primary colors and white color of the mastering display. The chromaticity coordinate information of the three primary colors of the mastering display and/or the chromaticity coordinate information of the white color of the mastering display may be signaled using Orig_color_gamut, Red-x, Red-y, Green-x, Green-y, Blue-x, Blue-y, White-x and/or White-y fields. These will be described in detail below with reference to FIGS. 11 and 14.

According to another embodiment of the present invention, the dynamic range mastering information may include additional information of the EOTF according to the EOTF type information. Here, the additional information of the EOTF may include EOTF_additional_info and/or EOTF_Coefficient. This will be described in detail below with reference to FIGS. 11 and 14.

Figure 2:
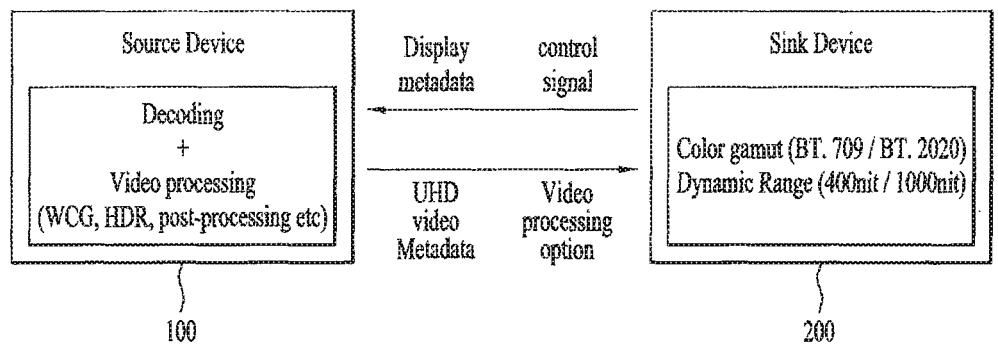
FIG. 2 is a diagram showing an example of connecting a source device and a sink device in order to transmit and receive a video image.

FIG. 2 is a diagram showing an example of connecting a source device and a sink device in order to transmit and receive a video image. Referring to this figure, the source device capable of performing image decoding and image quality processing and the sink device capable of outputting an image exchange information will now be described.

The source device 100 includes a device for decoding images received via various routes, such as broadcast, storage media such as Blu-ray, ultraviolet (UV) or secure content storage association (SCSA), or Internet protocol (IP) streaming, or a device capable of performing video processing for image quality processing. For example, the source device includes set-top boxes, players of storage media such as Blu-ray disc (BD) players, computers, etc.

Video processing of the source device 100 may include a method for changing image quality, such as wide color gamut (WCG), high dynamic range (HDR) or other post processing. In this case, video processing is not uniformly performed, but whether a video source can be played back on a display device is determined based on display information provided by the sink device, e.g., color gamut information or dynamic range information, and the image is converted into image quality suitable for the display device and provided thereto.

In addition, if the video processing procedure of the source device 100 needs to be controlled by the sink device 200, information about which video processing procedure is used may be received from the source device 100.

The source device 100 may receive display-related metainformation or display option information from the sink device 200. Based on the received information, the source device 100 may provide UHD video metadata and processing option information of processed video to the sink device

200. The sink device 200 may display video processed by the source device 100 based on the data or information provided by the source device 100. The sink device 200 may display video processed by the source device 100 according to the color gamut information suitable for the display or within the dynamic range.

Figure 3:
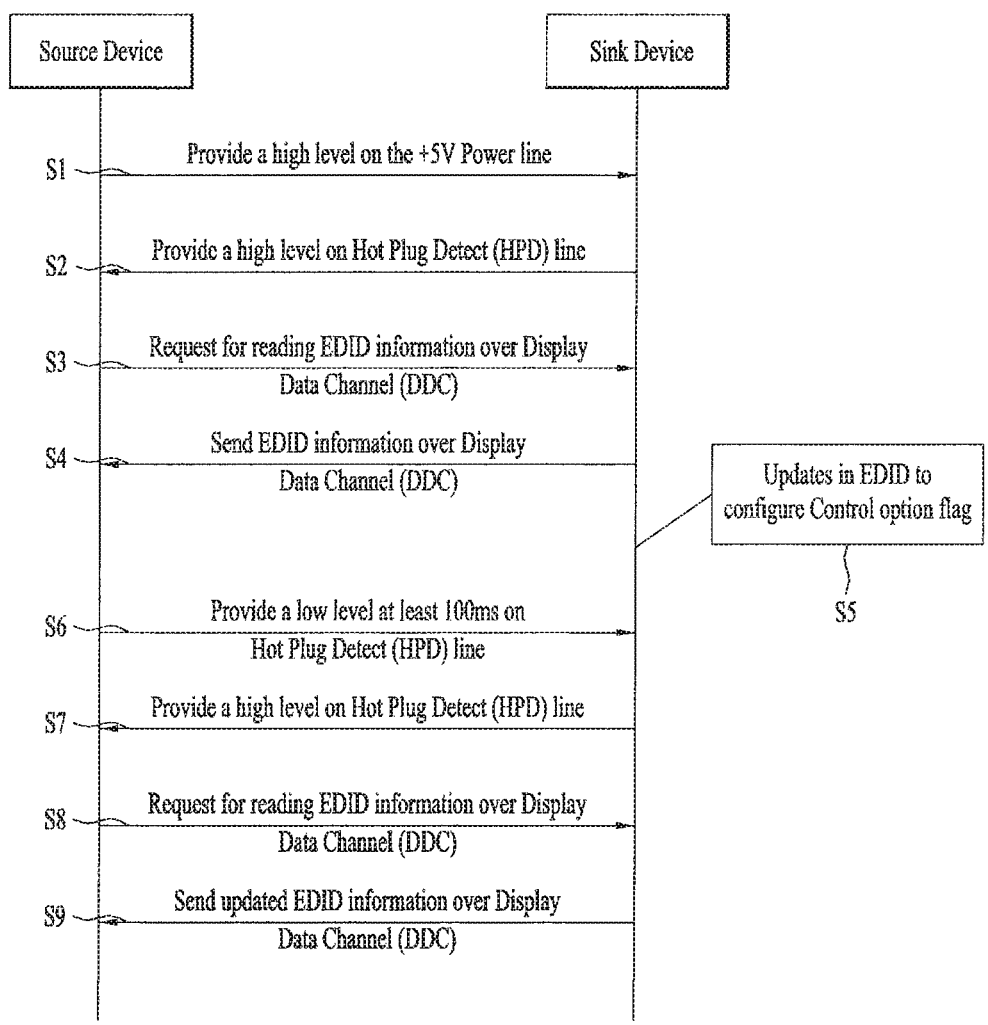
FIG. 3 is a diagram showing an embodiment of transmitting and receiving information when the source device is connected to the sink device according to an embodiment of the present invention.

FIG. 3 is a diagram showing an embodiment of transmitting and receiving information when the source device is connected to the sink device according to an embodiment of the present invention.

This example shows the case in which the source device is connected to the sink device via a wired interface such as a high definition multimedia interface (HDMI) or a DisplayPort. This example shows an embodiment in which, when the source device and the sink device are connected via the wired interface, the sink device 200 controls (activation or deactivation of) a high dynamic range (HDR) and WCG function of the source device 100 via a data block of the HDR of extended display identification data (EDID) and the source device reads the changed EDID of the sink device.

When the source device is connected to the sink device via the wired interface, the source device provides a high-level voltage on a +5V power line of the wired interface and the sink device confirms that the source device is connected (S1).

The sink device provides a high-level voltage on a hot plug detect line maintained at a low-level voltage to inform the source device that completion of connection with the sink device and display related information such as EDID (hereinafter, referred to as display related information) is ready to be read (S2).

The source device confirms that the hot plug detect line transitions to a high level and makes a request for reading the display related information from the sink device via a display data channel (S3) and the sink device transmits the display related information to the source device via the display data channel (S4).

When a field of a control option flag of an HDR data block of the display related information is changed by functional determination of the sink device or is signaled according to a user request (S5), the sink device provides a low-level voltage on the hot plug detect line and maintains this voltage for a predetermined time, for example, at least 100 ms, in order to inform the source device of the updated information of the display related information (S6).

When the source device can read the display related information, the sink device provides a high-level voltage to the hot plug line (S7) and the source device detects the high-level voltage and makes a request for reading the display related information via the display data channel (S8). Then, the sink device transmits the changed display related information via the display data channel (S9).

Based on such operation, an example of exchanging information between the source device and the sink device according to an embodiment of the present invention will be described.

According to the embodiment of the present invention, in response to the request of step S3 or S8, the sink device may deliver color gamut information and brightness information to the source device (included in S4 or S9).

The color gamut information may include color primary coordinates on a CIE xy diagram of a color gamut corresponding RGBW or color gamut information such as BT. 709 or BT. 2020. This information may be delivered via the color characteristics data block of a DisplayID defined in an interface. Brightness related information may include a maximum brightness value or minimum brightness value and may be delivered using a datablock defined in DisplayID, EDID or EDID extension information, etc. of the interface according to the example disclosed in the embodiment.

Then, the source device determines whether the color or brightness information of video needs to be adjusted based on the delivered display related information. If it is determined that the color or brightness information needs to be adjusted, the source device may perform transformation based on color mapping or dynamic range mapping information provided by video or autonomously provide color or brightness information of video.

The source device delivers final video obtained by adjustment to the sink device. At this time, color gamut or dynamic range related metadata of the final video may be delivered via an InfoFrame of the interface. The color gamut information may be delivered using color gamut information (e.g., BT. 709, BT. 2020, etc.) pre-defined in an AVI infoFrame of the interface. The dynamic range metadata related information may deliver maximum or minimum brightness information and may be delivered via a method of defining a new InfoFrame using the methods described in the embodiments or a method of extending an AVI InfoFrame.

If information on video processing of the source device needs to be provided when the source device delivers the final video, processing information of a video processing unit, such as HDR information or WCG information, may be delivered using post_processing_type in the InfoFrame via the methods described in the embodiments. In addition, if color transformation function information such as a new electro-optical transfer function (EOTF) needs to be defined and used in association with the HDR information of the final video, information on a new color transformation function may be delivered using an interface information flag.

The sink device determines whether processing of the final video by the source device is suitable and determines whether the source device needs to be controlled via feedback. In this case, the source device may be controlled via a control option flag in a datablock defined in DisplayID. EDID, EDID extension information, etc. described in the embodiments. If the result of video processing of the source device, such as WCG information or HDR information, is suitable, the sink device may activate bits related to the WCG information or HDR information such that the same processing continues.

If processing is unsuitable, the sink device may deactivate the bits related to the WCG information or HDR information to stop video processing.

The sink device changes video processing based on information included in the control option flag if the information delivered via the control option flag is different from video processing of the source device. If UHD video metadata is changed in association with changed video processing, the color characteristics information and brightness information in the InfoFrame may be changed and updated according to a video processing procedure with a changed post_processing_type. Then, step S5 is performed.

Hereinafter, information delivered from the sink device to the source will be described.

According to the embodiment of the present invention, if the source device processes HDR related information, the source device may perform video processing suitable for the sink device based on playback information of the sink device. In this case, the sink device may deliver information on a display dynamic range, e.g., sink black luminance level or sink white luminance level and a flag for controlling post processing of the source device to the source device. In this case, the data block of the DisplayID, EDID or EDID extension may be used, which will now be described in detail.

FIG. 4 is a diagram showing an example of information delivered from the sink device to the source device according to an embodiment of the present invention.

This figure shows an example of information delivered from the source device to the sink device using a data block of a DisplayID.

This figure shows an offset field and value field of the data block of the DisplayID and a description and format thereof. For example, if the offset field of the data block of the DisplayID is 0x00 and the value field is 0x14, an HDR data block may be indicated.

As shown in the figure, if the offset field is 0x03, a flag (control option flag) for controlling post processing of the source device may be indicated. A detailed example of the value will be described below.

If the offset field is 0x04 or 0x05, information on a brightness value (sink black luminance level, sink white luminance level, etc.) expressed by the sink device may be delivered.

The data block of the DisplayID may further include information necessary for video processing according to the offset field value. For example, if the offset field is 0x03, HDR related post processing related information may be delivered using a current reserved field, etc.

Here, the value of the offset field or the value field may be arbitrarily changed and a detailed example of the control option flag and an example of display information of the sink device will be described below.

FIG. 5 is a diagram showing a detailed field value of the above-described embodiment as an example of information delivered from the sink device to the source device according to an embodiment of the present invention.

As the information delivered from the sink device to the source device, the control option flag of the data block of the DisplayID is a field for controlling (on/off) a post processing procedure performed by the source device. According to the embodiment of the present invention, using this flag, various options to be provided in the future over the interface of the source/sink device may be indicated. Here, HDR and WCG related options are disclosed.

As described above, if the offset field of the data block of the DisplayID is 0x03, the control option flag for controlling the source device may be indicated. According to the bit location of the value field, HDR processing of the source device may be activated or WCG processing of the source device may be activated. In this example, this information is expressed using lower 2 bits.

The field disclosed in the present embodiment may be signaled by user request or controlled by functional determination of the sink device (if the processing capabilities of the sink device exceed those of the source device). In the embodiment of the present invention, information exchange between the sink and source devices may be performed with respect to frame rate control (FRC) and multilayer video enhancement function using reserved bits. Here, the offset field or the value field is an arbitrary value and may be changed.

FIG. 6 is a diagram showing a detailed example of a control option flag according to an embodiment of the present invention.

Information for controlling HDR and WCG processing performed by the source device may be set in lower 2 bits of the value field of the offset field of the control option flag. The following examples may be used by combinations of two flags.

In this example, if the value field is 00000000, this indicates that the source device does not perform any processing. For example, if the value field is 10000000, this indicates information on HDR processing of the source device, that is, indicates an option that the source device only performs HDR processing. As another example, if the value field is 01000000, this indicates information on WCG processing of the source device, that is, indicates an option that the source device only performs WCG processing.

As another example, if the value field is 11000000, this indicates control option information indicating that the source device performs both HDR and WCG processing based on the information delivered by the sink device, which may be used as an initial value.

FIG. 7 is a diagram showing a detailed example of sink device dynamic range information according to an embodiment of the present invention.

As shown, the sink device may deliver the dynamic range information of the sink device to the source device using the data block of the DisplayID and inform the source device of brightness information, etc. of the sink device.

The dynamic range information of the sink device indicates maximum and minimum physical brightness values (in nit or cd/m2) expressing the dynamic range of the display of the sink device.

For example, if the offset field of the data block of the DisplayID is 0x04 or 0x05, this indicates the dynamic range information of the sink device.

In this example, if the offset field of the data block of the DisplayID is 0x04, the brightness information of the lowest level of the sink device may be indicated using 8 bits higher than lower 8 bits.

If the offset field of the data block of the DisplayID is 0x05, the least significant bit (1 bit) of the value field indicates the brightness information of the lowest level of the sink device and the remaining bits of the value field indicate the brightness information of the highest level of the sink device.

Here, the offset field or the value field is an arbitrary value and may be changed.

The minimum brightness information (denoted by sink_black_luminance_level) and the maximum brightness information (sink_white_luminance_level) of the sink device indicated using this information are as follows.

For example, the minimum brightness information (sink_black_luminance_level) of the sink device indicates the minimum brightness of the display and may be expressed in units of 0.0001 in a range of 0 to 0.05 in consideration of general lowest brightness. That is, when the physical brightness of the display is brightness_black (in cd/m$^2$), real minimum brightness may be calculated from the minimum brightness information (sink_black_luminance_level) as follows.

Brightness_black=sink_black_luminance_level×10000

(0<=sink_black_luminance_level<=500<29)

For example, in case of a reference monitor, minimum reference brightness is 0.05 cd/m$^2$ and 500 obtained by multiplying the minimum reference brightness by 10000 (decimal number) may be transmitted.

The maximum brightness information (sink_white_luminance_level) of the sink device indicates the maximum brightness of the display and may be expressed in units of 100 in a range of 100 to 10000 in consideration of general highest brightness. That is, when the physical brightness of the display is brightness_white (in cd/m$^2$), real maximum brightness may be calculated from the maximum brightness information (sink_white_luminance_level) as follows.

Brightness_white=sink_white_luminance_level×100

(1<=sink_white_luminance_level<=100<27)

For example, in case of a reference monitor, maximum reference brightness is 100 cd/m$^2$ and 1 which is a quotient of the maximum reference brightness divided by 100 (decimal number) may be transmitted.

According to one embodiment of the present invention, the maximum brightness information of the sink device and/or the minimum brightness information of the sink device may indicate capabilities of the dynamic range of the display. That is, the maximum brightness information and/or the minimum brightness information of the sink device according to one embodiment of the present invention may indicate desired content max luminance data and/or desired content min luminance data necessary to optimally render content in consideration of capabilities of the display.

Another embodiment of delivering the display related information from the sink device to the source device will now be described.

FIG. 8 is a diagram showing a display parameters data block of a DisplayID as the display related information transmitted from the sink device to the source device according to an embodiment of the present invention.

As the display related information, the display parameters data block of the DisplayID may include all parameters of a monitor. As shown in this figure, the display parameters data block includes a horizontal or vertical image size (the offset field is 0x03 or 0x04), a horizontal or vertical pixel count (the offset field is 0x05 or 0x06), a flag indicating a function supportable by the monitor (the offset field is 0x0B), a gamma used in a transformation function (the offset field is 0x0C), a display aspect ratio (the offset field is 0x0D) and a pixel bit depth (the offset field is 0x0E).

According to the embodiment of the present invention, the display parameters data block may include the above-described control option flag information and sink device dynamic range information. That is, according to the embodiment of the present invention, the sink device may deliver the display parameters data block information including the above-described control option flag and sink device dynamic range information to the source device.

In this embodiment, if the offset field of the display parameters data block is 0x0F. this may indicate a control option flag and, if the offset field is 0x10 or 0x11, information on the brightness value (Sink Black Luminance Level, Sink White Luminance Level, etc.) of the sink device may be included.

The value field of the control option flag if the offset field is 0x0F, the value field of the sink device dynamic range information if the offset field is 0x10 or 0x11 and descriptions of the value fields are shown in FIGS. 5 to 7. Here, the offset field or the value field is an arbitrary value and may be changed.

In the embodiment of the present invention, transfer curve information suitable for HDR may be delivered via transfer characteristic gamma.

Another embodiment of delivering the display related information from the sink device to the source device will now be described.

FIG. 9 is a diagram showing a display device data block as the display related information described in an embodiment of the present invention. In the embodiment of the present invention, an example of information delivered from the source device to the sink device using the display device data block is described.

The display device data block includes information indicating the characteristics of the display panel. The display device data block includes display device technology (the offset field is 0x03), the operating mode of the display device (the offset field is 0x04), a video size expressible by a pixel count (the offset field is 0x05 to 0x08), a display aspect ratio (the offset field is 0x09 to 0x0A), a bit depth (the offset field is 0x0E) and a response time (the offset field is 0x0F). In the embodiment of the present invention, as shown in this figure, the control option flag information and the sink device dynamic range information of the display panel may be delivered to the source device in addition to the display device data block.

According to the embodiment of the present invention, if the offset field of the display device data block is 0x0F. this may indicate the control option flag and, if the offset field of the display device data block is 0x10 or 0x11, this may indicate the sink device dynamic range information.

The example of the value field if the offset field of the display device data block is 0x0F and the example of the value field if the offset field of the display device data block is 0x10 or 0x11 is shown in FIGS. 5 to 7 or FIG. 8. Here, the offset field or the value field is an arbitrary value and may be changed.

As another example of delivering the display related information from the sink device to the source device, the sink device may deliver the control option flag and the sink device dynamic range information using a vendor-specific data block of a DisplayID. The vendor-specific data block is data used when the sink device delivers information which is not defined in the data block and the above-described control option flag and sink device dynamic range information may be included in this data block.

As another example of delivering the display related information from the sink device to the source device, the sink device may use a product identification data block of the DisplayID.

The product identification data block of the DisplayID may include information on a manufacturer of a display device, a serial number of a display device, a product ID. etc. At this time, if the sink device can check information on each product via the manufacturer, manufacture date, and product ID of a display device, dynamic range information of each product may be delivered to the source device using this information. According to the present invention, if the product identification data block of the DisplayID indicates dynamic range information as the ID of the product, the control option flag is delivered using any one of the above-described embodiments.

As another example of delivering the display related information from the sink device to the source device, the sink device may deliver the display related information to the source device using a transfer characteristics data block. The transfer characteristics data block is a data block for delivering transfer curve related information of the display. The transfer characteristics data block is a data block indicating use of an arbitrary gamma function or support of a piecewise linear curve. Since a part defining peak luminance and lowest luminance of the display panel is not present, the sink device may deliver, to the source device, dynamic range information obtained by including the above-described control option flag and sink device dynamic range information in the transfer characteristics data block.

FIG. 10 is a diagram showing another example of delivering the display related information from the sink device to the source device according to one embodiment of the present invention. According to the embodiment of the present invention, the sink device may deliver the display related information to the source device using consumer electronics association (CEA) EDID extension information.

The sink device may deliver CEA EDID extension information including device attribute information supportable by the CE sink device to the source device in addition to the EDID defined in VESA of CEA-861. In this case, the sink device may deliver the dynamic range information shown in this figure to the source device.

The extension data block of the CEA EDID extension information may include video, audio, speaker allocation, vendor-specific and video capability data blocks. In order to identify the extension data block, a predefined tag code may be included bits 5 to 7 of a first byte of each data block.

According to the embodiment of the present invention, bits 5 to 7 of the first byte of the CEA EDID extension data block may include a tag code representing dynamic range information.

As shown in the figure, in the CEA EDID extension data block, the dynamic range information may be represented by minimum brightness information of the sink device (8 bits higher than lower 8 bits of the lowest brightness level of the sink device). LSB information of the minimum brightness of the sink device (lowest brightness level of the sink device (LSB)) and the maximum brightness information of the sink device (highest brightness level of the sink device (total 7 bits)) as described above. Bit allocation is arbitrary and may be changed. Accordingly, according to the embodiment of the present invention, the sink device may deliver the maximum/minimum brightness information of the sink device of the display related information to the source device using the CEA EDID extension information.

The maximum brightness information of the sink device according to one embodiment of the present invention may indicate the maximum brightness information capable of being processed by the sink device and the minimum brightness information of the sink device may indicate the minimum brightness information capable of being processed by the sink device.

Next, information to be delivered from the source device to the sink device according to an embodiment of the present invention will be described.

The source device may determine whether brightness and color gamut of content is suitable for the sink device based on the display related information and color gamut related information of the sink device and transform the brightness and color gamut of the content if necessary. In this case, if UHD video is processed, the source device should deliver information on which processing is performed and information on brightness and color gamut after video processing to the sink device. This is to control post processing of the sink device and this embodiment will now be described in detail.

According to the embodiment of the present invention, the source device may deliver UHD video processing related information to the sink device via an InfoFrame defined in CEA 861.

FIG. 11 is a diagram showing information to be delivered from the source device to the sink device according to an embodiment of the present invention.

In CEA 861, color gamut information of the InfoFrame defined as interface information of the source/sink device may be delivered via an AVI InfoFrame. In the embodiment of the present invention, the source device delivers information on UHD video processing to the sink device via the InfoFrame. Thereby, video processing information such as brightness information of UHD video, arbitrary color gamut information and HDR information or WCG information may be delivered to the sink device. According to the present embodiment, the source device may deliver information on post processing, brightness information of content after post processing, brightness information of content before post processing and color gamut information to the sink device.

The information on post processing includes information on the status of content and may be used as a response to a request of the sink device. The brightness information of the content after post processing may include minimum brightness information black_luminance_level of the content and maximum brightness information white_luminance_level of the content. The brightness information of the content before post processing may include minimum brightness information orig_black_luminance_level of the content and maximum brightness information orig_white_luminance_level of the content. The color gamut information of the content may be represented by Orig_color_gamut information. These will now be described in detail.

An InfoFrame type code indicates the type of this InfoFrame and may indicate a frame including information on UHD video processing if the value thereof is 0x07. Here, the information on UHD video processing may be referred to as dynamic range and mastering information. The dynamic range and mastering information according to one embodiment of the present invention may include dynamic range related information of content.

An infoFrame version number indicates the version information of this frame and length of HDR InfoFrame indicates the length information of HDR InfoFrame.

P3 to P0 fields of data byte 1 refer to fields for controlling (on/off) the prost processing procedure performed by the source device as a post_processing_type_flag. Here, using these fields, option information related to HDR information or WCG information is disclosed and a detailed description thereof will be given below. In one embodiment of the present invention, if content produced with BT. 709 is encoded and transmitted using BT. 2020, the contents color gamut and/or container color gamut may be distinguishably signaled using these fields and/or the below-described original color gamut Orig_color_gamut. This will be described in detail below.

R2 to R0 fields of data byte 1 indicate reserved bits and an E0 field indicates whether a new color transformation function (EOTF, etc.) is used via a new_EOTF_flag. The reserved bits are flags available in the future when a new EOTF suitable for HDR information is defined.

Data type 2 may include minimum brightness information of content and is represented by a black_luminance_level herein. In this embodiment, highest 8 bits of the minimum brightness information is represented in the data byte 2 field.

The minimum brightness information of content may be expressed in units of 0.0001 in a range of 0 to 0.05 in consideration of general lowest brightness. That is, when the physical brightness of the display is brightness_black (in $cd/m^2$), the following relationship is obtained.

Brightness_black=black_luminance_level×10000

(0<=black_luminance_level<=500<29)

For example, in case of a reference monitor, minimum reference brightness is 0.05 $cd/m^2$ and 500, obtained by multiplying the minimum reference brightness by 10000 (decimal number), may be expressed as brightness information.

Data byte 3 may include an LSB (1 bit) of minimum brightness information black_luminance_level of content and maximum brightness information (7 bits) white_luminance_level as shown in this figure.

The maximum brightness information white_luminance_level indicates the maximum brightness of the content and may be expressed in units of 100 in a range of 100 to 10000 in consideration of general highest brightness. That is, when the physical brightness of the display is brightness_white (in cd/m$^2$), the following relationship is obtained.

Brightness_white=white_luminance_level×100

(1<==white_luminance_level<=100<27)

For example, in case of a reference monitor, maximum reference brightness is 100 cd/m$^2$ and 1 which is a quotient of the maximum reference brightness divided by 100 (decimal number) may be expressed as brightness information.

Data byte 4 may express most significant bits (8 bits) of original minimum brightness information Orig_black_luminance_level of content and data byte 5 may express an LSB (1 bit) of original minimum brightness information Orig_black_luminance_level of content and original maximum brightness information Orig_white_luminance_level (7 bits) of content.

Original minimum brightness information Orig_black_luminance_level of content indicates the minimum brightness of content before HDR processing in the source device. The expression and range thereof are equal to those of black_luminance_level. In the present embodiment, the field may be transmitted only when HDR information indicates "on" in the post_processing_type.

Similarly, original maximum brightness information Orig_white_luminance_level of content indicates the maximum brightness of content before HDR processing in the source device. The expression and range thereof are equal to those of white_luminance_level. In the present embodiment, the field may be transmitted only when HDR information indicates "on" in post_processing_type.

According to one embodiment of the present invention, if signaling of the dynamic range differentiated from the contents dynamic range is necessary, original minimum brightness information Orig_black_luminance_level and the original maximum brightness information Orig_white_luminance_level may be used. At this time, the dynamic range differentiated from the contents dynamic range may include a dynamic range before and after image processing, a dynamic range used upon encoding, a dynamic range of a mastering display, a dynamic range of a target display, a dynamic range of a container, etc. Here, the dynamic range of the container may indicate a maximum/minimum dynamic range of the container when the dynamic range of original content and the dynamic range of the container are different. For example, the case in which the dynamic range of original content is different from the dynamic range of the container may include the case in which content produced in a low dynamic range (LDR) is encoded and transmitted in a high dynamic range (HDR), the case in which content produced in an HDR is encoded and transmitted in an LDR, the case in which content having a narrow dynamic range is transmitted to a container having a wide dynamic range, the case in which content having a wide dynamic range is transmitted to a container having a narrow dynamic range, etc. Here, the dynamic range of the container is different from the dynamic range of content and may indicate the dynamic range of the display. In addition, the mastering display may indicate a display subjected to a mastering procedure according to the brightness and/or color information of content and/or display. Accordingly, the dynamic range of the mastering display indicates the dynamic range supportable by the display.

Data type 6 may include original color gamut information Orig_color_gamut and S3 to S0 may include reserved bits. The original color gamut information Orig_color_gamut indicates the color gamut of content before WCG processing in the source device. Detailed examples of the standard color gamut will be described below. In the present embodiment, the field may be transmitted only when WCG indicates "on" in the post_processing_type.

In one embodiment of the present invention, if the source device does not perform separate color gamut mapping and the color gamut of the original content is different from that of the container, the value of the post_processing_type of 0000 (no processing) or 1111 (different color gamut) is signaled such that information on each color gamut is delivered to the display device while distinguishing between the contents color gamut and the container color gamut using the original color gamut information Orig_color_gamut. Here, the case in which the color gamut of the original content and the color gamut of the container are different may include the case in which content produced according to BT. 709 is encoded and transmitted with BT. 2020. In another embodiment of the present invention, the container color gamut may be expressed using colorimetry definition (C1, C0) of Data bytes 2 and 3 and extended colorimetry (EC2, EC1, EC0) in the AVI InfoFrame of CEA 861-F and the contents color gamut may be expressed using the Orig_color_gamut. In contrast, in another embodiment of the present invention, the contents color gamut may be expressed using colorimetry definition (C1, C0) of Data bytes 2 and 3 and extended colorimetry (EC2, EC1, EC0) in the AVI InfoFrame of CEA 861-F and the container color gamut may be expressed using the Orig_color_gamut. In another embodiment of the present invention, the contents color gamut may be expressed using the Orig_color_gamut and the container color gamut may be expressed using Red-x, Red-y, Green-x, Green-y, Blue-x, Blue-y, White-x and/or White-y. In contrast, in another embodiment of the present invention, the container color gamut may be expressed using the Orig_color_gamut and the contents color gamut may be expressed using Red-x, Red-y, Green-x, Green-y, Blue-x, Blue-y, White-x and/or White-y. Here, the container color gamut is different from the content color gamut and may indicate the display color gamut. Further, Orig_color_gamut, Red-x, Red-y, Green-x, Green-y, Blue-x, Blue-y, White-x and/or White-y may include chromaticity coordinates of three primary colors and/or white color of the container and/or display.

According to one embodiment of the present invention, if signaling of color gamut differentiated from contents color gamut is necessary, the above-described original gamut information Orig_color_gamut may be used. At this time, the color gamut different from the contents color gamut may include color gamut before and after image processing, container color gamut, color gamut used upon encoding, color gamut of a mastering display, color gamut of a target display, etc. Here, the mastering display may indicate a display subjected to a mastering procedure according to the brightness and/or color information of content and/or display. That is, color gamut of the mastering display indicates the color gamut supportable by the display.

Data byte 7 to data byte 16 refer to fields indicating arbitrary color gamut information. In this figure, arbitrary color gamut information include Red-x, Red-y, Green-x, Green-y, Blue-x, Blue-y, White-x and White-y.

Here, Red-x indicates an x coordinate of the R color of a color gamut (e.g., CIE 1931) using a value of 0 to 1 in the binary form. In the present embodiment, a total of 10 bits is used and higher 8 bits of data byte 9 and higher 2 bits of data byte 6 may be used.

Similarly, Red-y indicates a y coordinate of the R color of the color gamut (e.g., CIE 1931) using a value of 0 to 1 in the binary form. In the present embodiment, a total of 10 bits is used and higher 8 bits of data byte 10 and lower 2 bits of data byte 6 may be used.

The source device may deliver the color gamut information using data byte 7 to data byte 16 if appropriate information is not expressed in the original gamut information Orig_color_gamut of the content.

As another embodiment of the present invention, the original gamut information Orig_color_gamut shown in FIG. 11 is not used and the original gamut information may be used only using information corresponding to data byte 7 to data byte 16. Information corresponding to data byte 7 to data byte 16 is further used only when the original color gamut information Orig_color_gamut indicates a specific value.

Data byte 17 may include an E3 field, an E2 field, an E1 field, an E0 field and/or a number_of_coefficients field.

The E3 to E1 fields may be EOTF_type fields indicating the type of the EOTF used by a content producer for optimal image quality of HDR content. According to one embodiment of the present invention, a plurality of EOTF standards may be established and a content producer may arbitrarily define and use an EOTF. A detailed description of the meaning of the EOTF_type value will be given below.

The E0 field may indicate a private_EOTF_coeff_flag. If this field value is 1, this field may indicate that a separate coefficient is used according to EOTF_type. For example, if different coefficients are used for the same function, such as if a suitable EOTF coefficient is changed according to maximum brightness, in one embodiment of the present invention, a suitable coefficient may be transmitted using this field. In addition, according to another embodiment of the present invention, a separate parameter may be set and signaled via the EOTF_type. If this field value is 0, this field may indicate that a default parameter is used. Here, the parameter and the coefficient have the same meaning. According to one embodiment of the present invention, if the E0 field is 1, data bytes 18 to 18+N may be further used and, if the E0 field is 0, data bytes 18 to 18+N may not be used.

The number_of_coefficients field may indicate the number of coefficients used when the E0 field is 1.

Data type 18 may include an EOTF_additional_info field. The EOTF_additional_info field may indicate additional information according to the EOTF_type if additional information needs to be delivered according to the EOTF_type. For example, if a suitable EOTF coefficient is changed according to maximum brightness, this field may include information on target max brightness. According to one embodiment of the present invention, if coefficients of a plurality of EOTF functions according to various conditions need to be delivered according to the given EOTF_type, for example, if the coefficient is changed according to maximum brightness and all coefficients according to a variety of maximum brightnesses should be delivered, this field may be used to provide information on the coefficients. In this case, a method for designating a field indicating the number of conditions and designating EOTF_target_max_brightness and EOTF_coeffcients 1 to N with respect to each condition may be used.

Data bytes 18+1 to 18+N may include EOTF_Coefficients 1 to N fields, respectively. The EOTF_Coefficients 1 to N fields may indicate a parameter value used if the E0 field is 1. In addition, this field may be used to transmit an arbitrary EOTF function.

Assume that the above-described information is transmitted from the source device to the sink device over an interface. However, this information may be transmitted via video (e.g., SEI message) or a separate metadata delivery method of a storage device. Accordingly, the same information may be defined in a video source or the source device may receive additional metadata of content via an external server.

According to one embodiment of the present invention, the InfoFrame shown in this figure may be referred to as a dynamic range and mastering InfoFrame.

FIG. 12 is a diagram showing a detailed example of post processing type information disclosed according to an embodiment of the present invention. As shown, the source device may deliver display related information and color gamut information to the sink device via the InfoFrame if the source device performs post processing of UHD video to suit the sink device.

The P3 to P0 fields of InfoFrame Data byte 1 indicate the post_processing_type and options related to HDR information or WCG information and the post processing type is shown in this figure.

For example, if the post_processing_type is 0000, this indicates that the source device does not perform any processing and, if the post_processing_type is 0001, this indicates that the source device performs dynamic range mapping.

For example, if the post_processing_type is 0010, this indicates that the source performs color gamut mapping and, if the post_processing_type is 0011, this indicates that the source device suitably performs processing based on the information delivered by the sink device. This value may be used as an initial value.

The values 0110 to 1000 of the post_processing_type may be used for information exchange between the sink and source devices in the future, for the multilayer video enhancement function, and the values 1001 to 1110 may be used for user private.

For example, if the post_processing_type is 1111, this indicates that the original color gamut information Orig_color_gamut is used to distinguishably signal the contents color gamut and the container color gamut. That is, in one embodiment of the present invention, if signaling of the color gamut different from the contents color gamut is necessary, the post_processing_type field may be used. Similarly, in another embodiment of the present invention, if signaling of the dynamic range different from the contents dynamic range is necessary, the post_processing_type field may be used. In this case, for example, 1110 may be allocated as the post_processing_type.

FIG. 13 is a diagram showing a detailed example of original color gamut information Orig_color_gamut according to an embodiment of the present invention.

As shown, if the source device processes UHD video to suit the sink device, the original color gamut information Orig_color_gamut of the content may be transmitted to the sink device.

In this example, if the field of the color gamut information Orig_color_gamut of the original content is 0000, the color of the original content is defined according to REC.709 and, if the Orig_color_gamut field of the content is 0001, the color of the original content is defined according to BT. 2020 NCL. Similarly, if this field is 0010, 0011, 0110 or 0101, this indicates that the colors of the original content are defined according to xvYCC. DCI-P3. Adobe RGB or BT. 2020 CL, respectively.

FIG. 14 is a diagram showing another example of delivering video color information from the source device to the sink device according to an embodiment of the present invention.

In the embodiment of the present invention, the format of AVI InfoFrame version 3 may be extended to deliver the post processing type information post_processing_type_flag, color transformation function information new_EOTF_flag and brightness information black_luminance_level or white_luminance_level of video processed by the source device to the sink device. In the embodiment of the present invention, the post processing type information post_processing_type_flag, color transformation function information new_EOTF_flag and brightness information black_luminance_level or white_luminance_level of video processed by the source device may be delivered to the sink device using a newly defined AVI InfoFrame over the interface of the source/sink device.

According to the disclosed AVI InfoFrame, the source device may deliver information on processed video to the sink device according to data byte. In this example, data bytes 14 to 29 may include data bytes 1 to 16 shown in FIGS. 11 to 13.

Accordingly, according to the present embodiment, the source information may deliver information on post processing, brightness information of content after post processing, brightness information of content before post processing and color gamut information to the sink device.

In the embodiment of the present invention, the format of AVI InfoFrame version 3 may be extended to deliver Orig_color_gamut, RGBW index, EOTF_type, private_EOTF_coeff_flag, Number of Coefficients, EOTF_additional_info and/or EOTF_Coefficient to the sink device and to deliver the above-described information using a newly defined AVI InfoFrame over the interface of the source/sink device.

In this figure, data bytes 30 to data byte 31+N may include data byte 17 to data byte 18+N shown in FIGS. 11 to 13.

Figure 15:
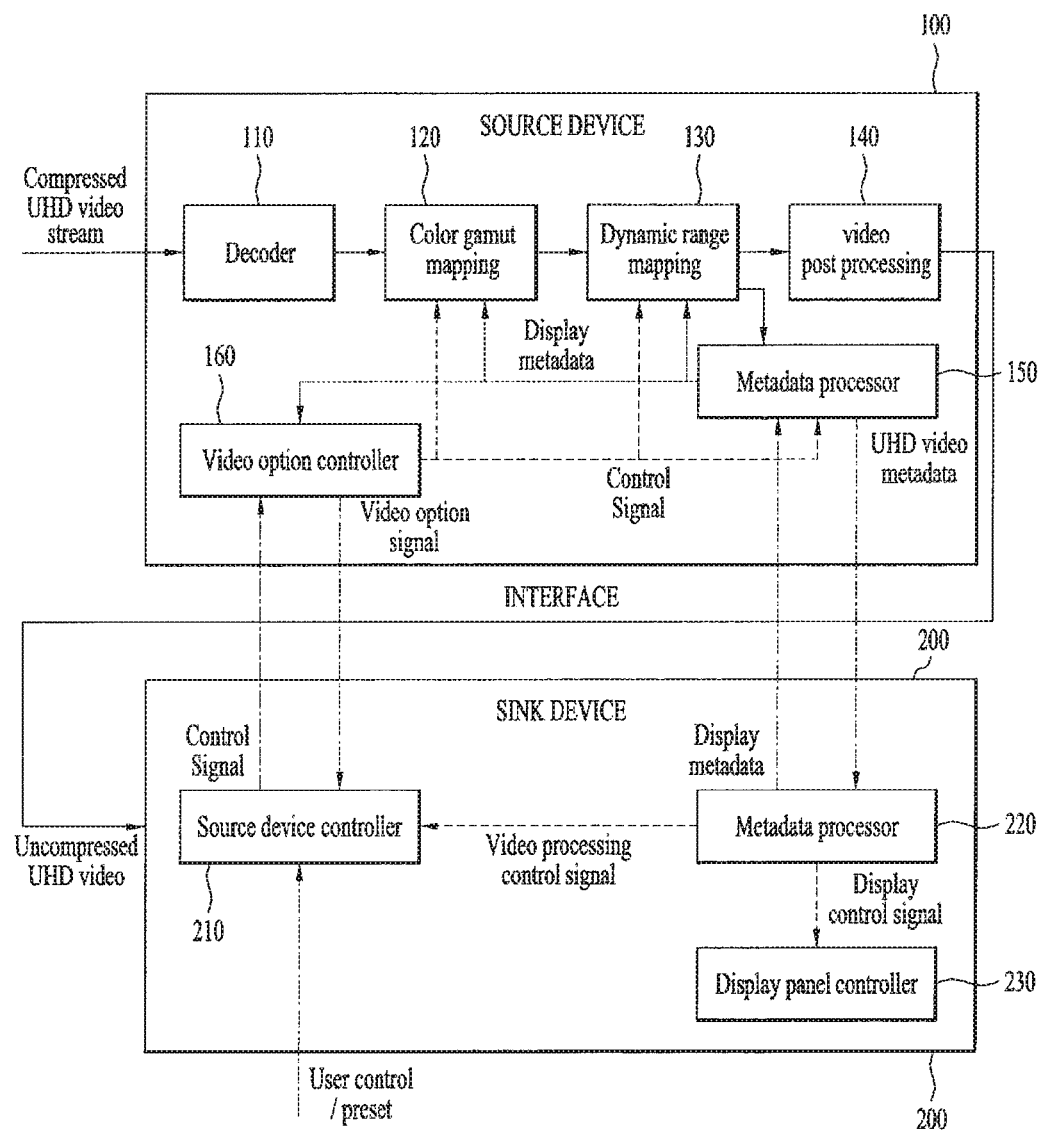
FIG. 15 is a diagram showing an example of a signal processing device according to one embodiment of the present invention and operations thereof.

FIG. 15 is a diagram showing an example of a signal processing device according to one embodiment of the present invention and operations thereof.

First, the example of the signal processing device according to one embodiment of the present invention includes a source device 100 and a sink device 200.

The source device 100 includes a decoder 110, a color gamut mapping unit 120, a dynamic range mapping unit 130, a post processing unit 140, a metadata processor 150 and an option controller 160.

The color gamut mapping unit 120, the dynamic range mapping unit 130 and the post processing unit 140 of the source device 100 may be referred to as a video processing unit and the color gamut mapping unit 120, the dynamic range mapping unit 130 and the post processing unit 140 of the video processing unit may individually operate upon video processing, if necessary, regardless of a previous block.

The sink device 200 includes a source device controller 210, a metadata processor 220 and a panel controller 230. If the source device 100 is connected to the sink device 200 via an interface, information may be transmitted and received according to the protocol shown in FIG. 3. Transmission and reception of information between the devices are performed via the interface.

The source device 100 may decode an encoded UHD video stream, perform post processing of decoded UHD video, if necessary, or process UHD video according to display capabilities of the sink device 200, and provide the processed UHD video to the sink device.

The sink device 200 may receive and display the UHD video decoded by the source device 100. The sink device may provide information on display capabilities of the sink device 200 to the source device 100 and receive and display the UHD video displayable by the sink device 200 from the source device 100.

The option controller 160 of the source device 100 may transmit a video option signal via the interface with the sink device 200 to request the display related information. The display related information may include color gamut information and display brightness related information. The video option information transmitted from the source device 100 to the sink device 200 is shown in FIGS. 11 to 14.

The metadata processor 150 of the source device 100 may transmit metadata of UHD video to the sink device 100 and the sink device 220 may transmit metadata related to the display device to the source device 100.

The decoder of the source device 100 may receive and decode the encoded UHD video stream.

The color gamut mapping unit 120 maps color gamut Information of the decoded UHD video. In this case, the color gamut information of the UHD video may be mapped and changed using the display related information of the sink device 200 or the metadata of the UHD video.

Alternatively, the dynamic range mapping unit 130 may map the dynamic range of the decoded UHD video. In this case, the dynamic range of the UHD video may be mapped and changed using the display related information of the sink device 200 or the metadata of the UHD video.

The post processing unit 140 may perform video post processing with respect to the decoded UHD video. Video post processing may be performed based on the display related information.

The metadata processor 150 may transmit the metadata of the UHD video to the sink device 200 and receive the metadata related to the display from the sink device.

The option controller 160 may transmit the video option information to the sink device 200 and receive display option information from the sink device 200. Examples of the display option information transmitted from the sink device 100 to the source device 200 are shown in FIGS. 4 to 10. The video option information transmitted from the source device 100 to the sink device 200 is shown in FIGS. 11 to 14.

The source device controller 210 of the sink device 200 may transmit a control signal for controlling the source device 100 and receive a user control signal from a user.

The metadata controller 220 of the sink device 200 may receive the metadata of the UHD video from the source device 100 and transmit the metadata related to the display device to the source device 100. The metadata processor 220 may transmit a video processing control signal to the source device controller 210 to enable the source device controller 210 to transmit the control signal.

The panel controller 230 may control the display panel according to the display control signal of the metadata processor 220.

In the embodiment of the present invention, it is possible to perform video processing adapted to the display. That is, in the embodiments of the present invention, information exchange between the source and sink devices, video processing and display methods may be changed according to capabilities of the sink device 200. Hereinafter, an example of transmitting the metadata information of the sink device 200 to the source device 100, performing video processing based on the display related information at the source device and receiving the display related information and outputting video by the sink device 200 will be described in detail.

First, a first embodiment in which the sink device 200 is a high-end UHD sink device will be described.

If the sink device 200 is a high-end UHD sink device, the sink device 200 may transmit display related metadata to the source device 100. The display related information may include display color gamut information (or color primary information corresponding to RGBW) and display dynamic range related information (e.g., peak luminance information and black luminance information). The metadata processor 220 of the sink device 200 may process the display related information. For example, the metadata processor 220 of the sink device 200 may store the display related information, which will be referred to upon content processing and display, and request this information from the source device 100 as necessary.

The source device 100 may deliver the control signal of the source device 100 as well as the color and brightness related metadata of the display when delivering the display related information to the sink device 200.

The control signal of the source device 100 may include information indicating which video processing of the source device 100 is possible. The control signal of the source device 100 may be generated based on a displayable color gamut delivered by the source device controller 210 of the sink device 200 and may be generated according to a default processing request without information received from the sink device 200.

Although an information exchange process between the source and sink devices is performed when the two devices are connected, information exchange between the two devices may be performed again when broadcast or streaming content is received in a state wherein the source and sink devices are connected, when content is changed or when a specific scene is changed.

Video processing when the sink device 200 is a high-end UHD sink device may be performed as follows.

The post processing unit 140 of the source device 100 may determine whether post processing should be performed with respect to the decoded UHD video based on the display related information of the sink device 200 from the metadata processor 150 and output a control signal thereof. The source device 100 may perform video processing related to WCG information or HDR information of the UHD video, e.g., color gamut mapping or dynamic range mapping. If display capabilities of the sink device 200 are sufficient to play the UHD video back after video post processing, the option controller 160 of the source device 100 may deliver the information to the post processing unit 140. If the WCG information or HDR information of the video is changed based on the display color gamut information or brightness information of the sink device 200, the metadata processor 150 may transmit the display related metadata to the color gamut mapping unit 120 or the dynamic range mapping unit 130.

The post processing unit 140 of the source device 100 may perform post processing using metadata transmitted along with video, for example, a WCG SEI message or an HDR SEI message. The video decoder 110 or the post processing unit 140 may decode enhancement layer data to increase image quality of output video, if enhancement layer data is transmitted according to scalable coding.

Although the image quality of output video may be further improved to suit the image quality of the display, if additional information for video processing is not received from the sink device 200, the source device 100 may autonomously perform an image quality improvement function.

The metadata processor 150 delivers UHD video metadata including the WCG information or HDR information of the decoded or post-processed video to the sink device 200. In addition, the option controller 160 may contain the processed video processing information in the video option information (video option signal) and transmit the video option information to the source device controller 210. The video option information is shown in FIGS. 11 to 14.

If the video decoded by the decoder 110 is suitable for the display, the video may be delivered to the sink device 200 for playback, without separate processing of the WCG information or HDR information of video. In this case, the option controller 160 may signal information indicating that separate video processing is not performed.

The sink device 200 may display the UHD video via the display device. In this case, although the sink device 200 may play the processed video back via the source device 100 without transformation, it may be determined whether the video delivered by the source device 100 has been processed to suit the display. The source device controller 210 of the sink device 200 may output the control signal to the source device 100. The source device controller 210 of the sink device 200 may determine a portion in which a problem occurs during video processing of the source device 100 and output the control signal to stop video processing, if the video is not suitably processed. This control function may be turned on/off according to a user request. The sink device 200 may output a video processing option to the user and provide a menu or interface UI for controlling the same to the user.

The sink device 200 may analyze information on the metadata processor 220 of the sink device 200 and then control the display device via the panel controller 230 to provide a playback environment suitable for content, if brightness and color of the display device can be controlled.

Next, a second embodiment wherein the sink device 200 is a legacy UHD sink device will be described. For the same portions as the first embodiment, refer to the first embodiment.

The sink device 200 transmits metadata of the legacy UHD sink device to the source device 100. The metadata of the legacy UHD sink device may include color gamut information (or color primary information corresponding to RGBW) and display dynamic range related information (e.g., peak luminance information and black luminance information) of the display. The metadata processor 150 of the source device 100 may receive and process the metadata of the legacy UHD sink device.

The option controller 160 of the source device 100 determines whether post processing is performed with respect to the decoded UHD video based on the display related information acquired by the metadata processor 150 and outputs a control signal.

If capabilities of the display are insufficient for image quality (color and brightness) of video to be displayed, appropriate processing may be performed with respect to the video to achieve color and brightness expressible by the display. For example, the color gamut mapping unit 120 or the dynamic range mapping unit 130 of the source device 100 may map the color gamut information or dynamic range information of the UHD video to information suitable for the display device.

The source device 100 may change WCG information or HDR information of video data based on the metadata of the video data, e.g., the WCG SEI message, the HDR SEI message, etc. or according to the function of the source device 100. If the WCG information or HDR information of the video data is changed, the option controller 160 may contain the WCG information or the HDR information in the video option information (video option signal) and transmit the video option information to the sink device 200. The video option information is shown in FIGS. 11 to 14.

If the color and brightness range of the display of the sink device 200 can support the color and dynamic range of video, the source device 100 may transmit the video to the sink device 200 without additional video processing. The option controller 160 of the source device 100 may deliver information indicating that the metadata, WCG information or HDR information of the UHD video is not processed to the sink device 200 via the video option signal.

The display device of the sink device 200 may play the UHD video back. If it is determined that the WCG information or HDR information of the UHD video received by the sink device 200 is not suitable for the display device of the sink device 200, the source device controller 210 may deliver a control signal to the source device 100. The user can control the functions related to the display device via a user menu or an interface UI.

FIG. 16 is a diagram showing the configuration of an EOTF type according to one embodiment of the present invention.

According to one embodiment of the present invention. EOTF type "000" indicates a reserved bit, EOTF type "001" indicates that an EOTF_type1 transformation curve is used, EOTF type "010" indicates that an EOTF_type2 transformation curve is used, and EOTF types "011" to "111" indicate user private.

Figure 17:
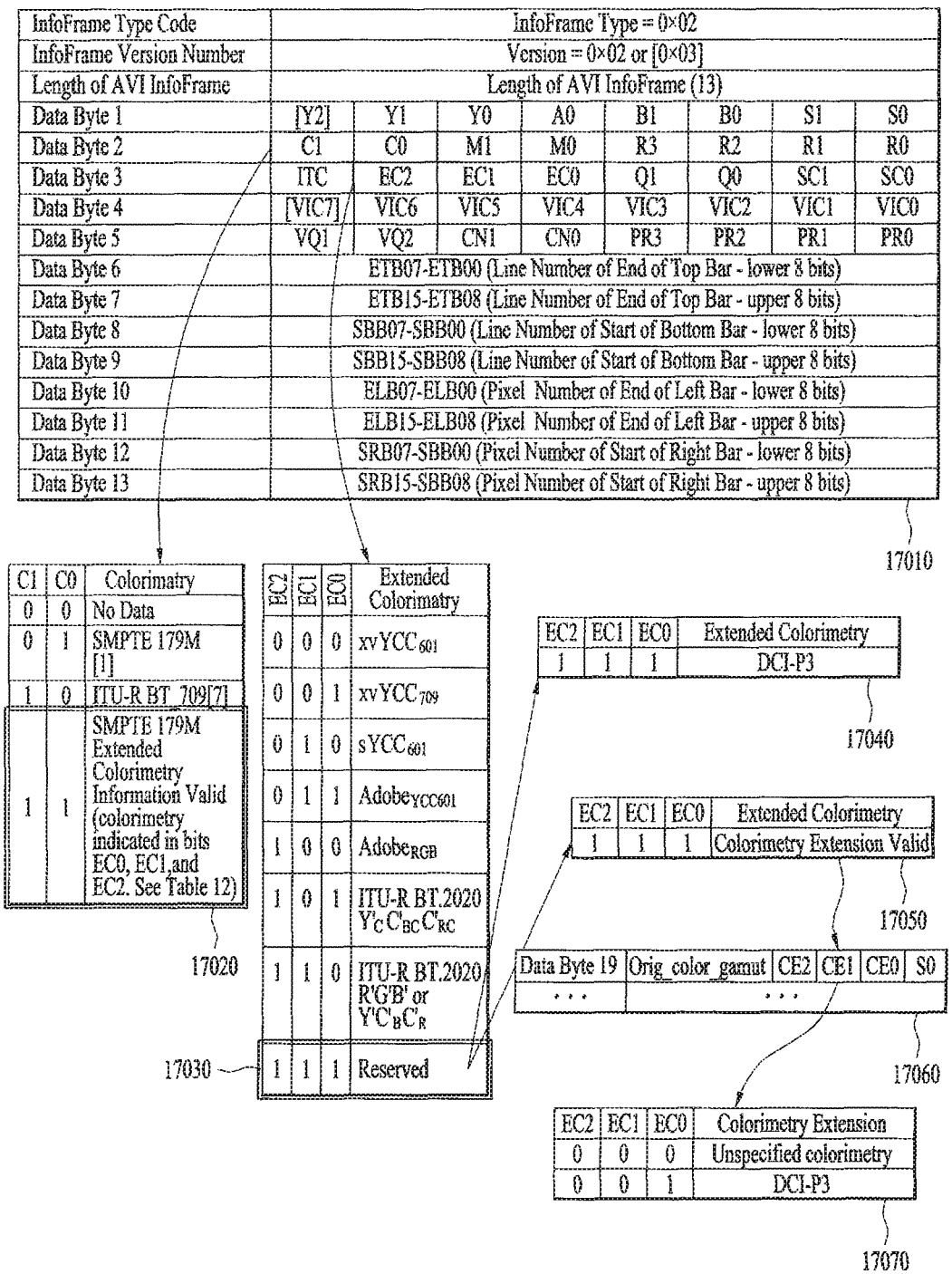
FIG. 17 is a diagram showing a method of signaling a DCI-P3 color gamut according to one embodiment of the present invention.

FIG. 17 is a diagram showing a method of signaling a DCI-P3 color gamut according to one embodiment of the present invention.

In the present invention, the following embodiments will be described in order to define a new color gamut such as DCI-P3.

In one embodiment of the present invention, using C1 and C0 fields included in data byte 2 of an existing AVI InfoFrame 17010, use of EC2 to EC0 fields included in data byte 3 for extension of the color gamut may be signaled (17020). Using reserved bits of EC2 to EC0 fields, DCI-P3 may be signaled. That is, when EC2 to EC0 are 111, use of DCI-P3 is indicated (17030, 17040).

In another embodiment of the present invention, colorimetry extension may be signaled using reserved bits of EC2 to EC0 fields included in data byte 3 of the existing AVI InfoFrame 17010. That is, when EC2 to EC0 are 111, this may indicate colorimetry extension (17030, 17050). Using S3 to S0 fields which are reserved bits included in data byte 6 of the above-described dynamic range and mastering InfoFrame or data byte 19 of the above-described AVI InfoFrame, use of DCI-PC may be signaled (17060, 17070). At this time, less than or more than 3 bits may be used as necessary. Further, using S3 to S0 fields, which are the reserved bits, use of an arbitrary color gamut may be signaled (17070).

Figure 18:
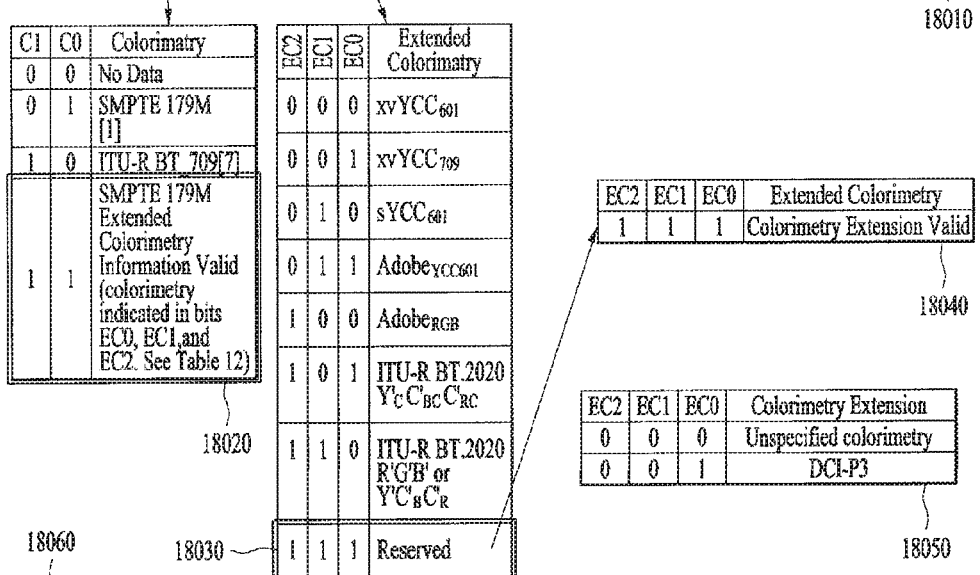
FIG. 18 is a diagram showing a method of signaling a DCI-P3 color gamut according to another embodiment of the present invention.

FIG. 18 is a diagram showing a method of signaling a DCI-P3 color gamut according to another embodiment of the present invention.

In one embodiment of the present invention, using C1 and C0 fields included in data byte 2 of an existing AVI InfoFrame 18010, use of EC2 to EC0 fields included in data byte 3 for extension of the color gamut may be signaled (18020). In addition, colorimetry extension may be signaled using reserved bits of EC2 to EC0 fields included in data byte 3 of the existing AVI InfoFrame 18010. That is, when EC2 to EC0 are 111, this may indicate colorimetry extension (18030, 18050). Using reserved bits of the dynamic range and mastering InfoFrame according to one embodiment of the present invention, use of DCI-P3 may be signaled. For example, as shown in the figure, reserved bits included in data byte 1 may be used (18060). Further, use of an arbitrary color gamut may be signaled using the above-described reserved bits (18050).

FIG. 19 is a diagram showing a method of signaling a DCI-P3 color gamut according to another embodiment of the present invention.

In one embodiment of the present invention, a new InfoFrame may be defined in order to signal a new color gamut such as DCI-P3. For example, an InfoFrame having an information type of 0x08 may be newly defined and bits for the new color gamut may be allocated to signal use of the new color gamut.

In another embodiment of the present invention, as a method of extending an existing AVI InfoFrame format, as shown in this figure, data byte 14 may be newly defined. At this time, using C1 and C0 fields included in data byte 2 of the existing AVI InfoFrame, use of EC2 to EC0 fields included in data type 3 for extension of the color gamut may be signaled. In addition, using reserved bits of EC2 to EC0 fields included in data byte 3 of the existing AVI InfoFrame, colorimetry extension may be signaled. That is, when EC2 to EC0 are 111, this may indicate colorimetry extension. Here, in one embodiment of the present invention, in consideration of backward compatibility, if EC2 to EC0 fields of data byte 3 are 111 while the same version number as the existing AVI InfoFrame is used, colorimetry extension may be recognized and data byte 14 may be read. In contrast, even if backward compatibility is not considered, as shown in this figure, in another embodiment of the present invention, information indicating that a new version number is assigned to the AVI InfoFrame, the length of the AVI InfoFrame is set to 14 and the InfoFrame of up to data byte 14 is defined may be signaled, colorimetry extension is recognized if EC2 to EC0 fields of data byte 3 are 111, and colorimetry may be signaled.

FIG. 20 is a diagram showing information on a transfer function which may be processed by the sink device according to one embodiment of the present invention.

This figure shows an example of information delivered from the source device to the sink device using a data block of a DisplayID. The case in which the offset field is 0x00 to 0x05 was described above.

In one embodiment of the present invention, as shown in this figure, the offset field may be assigned to further deliver transfer function related information of the sink device. At this time, in one embodiment of the present invention, a predefined transfer function (BT. 1886. SMPTE ST 2084, etc.) may be signaled and detailed information of an unspecified transfer function may be signaled.

As shown in this figure, if the offset field is 0x06, this may indicate a transfer function type flag. The transfer function type flag may signal a transfer function type. In one embodiment of the present invention, since each transfer function is designated as a flag, all supported transfer functions are simultaneously signaled even when a plurality of transfer functions is supported. Here, the transfer function may include BT. 1886, SMPTE ST 2084. Traditional gamma— SDR Luminance Range, Traditional gamma—HDR Luminance Range, etc. Here, the transfer function may include an electro optical transfer function (EOTF).

If the offset field is 0x07 to 0x0A, this may indicate unspecified TF details. In one embodiment of the present invention, if an unspecified transfer function is supported, this may be expressed via separate signaling. For example, if an unspecified transfer function is supported, transfer function type flag=0x80 (hexadecimal) or 10000000 (binary) may be indicated. In one embodiment of the present invention, in consideration of various unspecified transfer functions, the type of each transfer function may be signaled and additional information such as the number of necessary coefficients, bit depth or maximum/minimum brightness information may be delivered according to each type. At this time, the transfer function type may indicate any one of various types of transfer functions. If a plurality of transfer functions is delivered, a bit indicating that the plurality of transfer functions is used (e.g., a number_of_types field) is separately assigned and the order of the plurality of transfer functions may be indicated using this field. A detailed description of information included in the unspecified TF details will be described below.

If the offset field is 0x0B or more, this may indicate unspecified TF coefficients. In one embodiment of the present invention, coefficient information of an unspecified transfer function may be delivered using this field. The above-described coefficient information may include information on an intersection of the transfer function, a section and a used function.

According to one embodiment of the present invention, information delivered from the sink device to the source device may be referred to as extended display identification data (EDID). Here, the EDID may indicate capabilities of the sink device. Further, the EDID includes an HDR static metadata data block indicating HDR capabilities of the sink device and the HDR static metadata may include information on the above-described transfer function type.

The EDID according to one embodiment of the present invention may include one or more data blocks.

The HDR static metadata according to one embodiment of the present invention may be included in a data block and transmitted. Further, the HDR static metadata may include information indicating whether the data block includes the HDR static metadata and/or information indicating the length of the data block.

FIG. 21 is a diagram showing detailed field values used in a method of delivering information on a transfer function which may be processed by the sink device according to one embodiment of the present invention.

According to one embodiment of the present invention, an offset field value "0x06" is used to indicate the transfer function type, offset field values "0x07" to "0x0A" are used to indicate unspecified TF details, and offset field values 0x0B to or more are used to indicate unspecified TF coefficients. Here, the unspecified TF details indicate additional information of an unspecified transfer function if the sink device supports the unspecified transfer function and may include the type of an unspecified transfer function, the number of coefficients in the unspecified transfer function, the number of types of each transfer function if a plurality of transfer functions configures the unspecified transfer function, bit depth, the lowest brightness level of the sink device and/or the highest brightness level of the sink device.

If the offset field is 0x06, a higher 1 bit of the value may indicate that the unspecified transfer function may be processed, a next 1 bit thereof may indicate that the EOTF according to BT. 1886 may be processed and a next 1 bit thereof may indicate that the EOTF according to SMPTE ST 2084 may be processed.

If the offset field is 0x07, higher 4 bits of the value may be used to indicate the type of the unspecified transfer function and the lower 4 bits may be used to indicate the number of coefficients in the unspecified transfer function.

If the offset field is 0x08, higher 2 bits of the value may be used to the number of types and next 2 bits thereof may be used to indicate the bit depth.

If the offset field is 0x09, the value may indicate the lowest brightness level of the sink device.

If the offset field is 0x0A, the value indicates the lowest brightness level of the sink device using an LSB and indicates the highest brightness level of the sink device using the remaining 7 bits.

If the offset field is 0x0B or more, the value may indicate coefficient information used in the unspecified transfer function.

Figure 22:
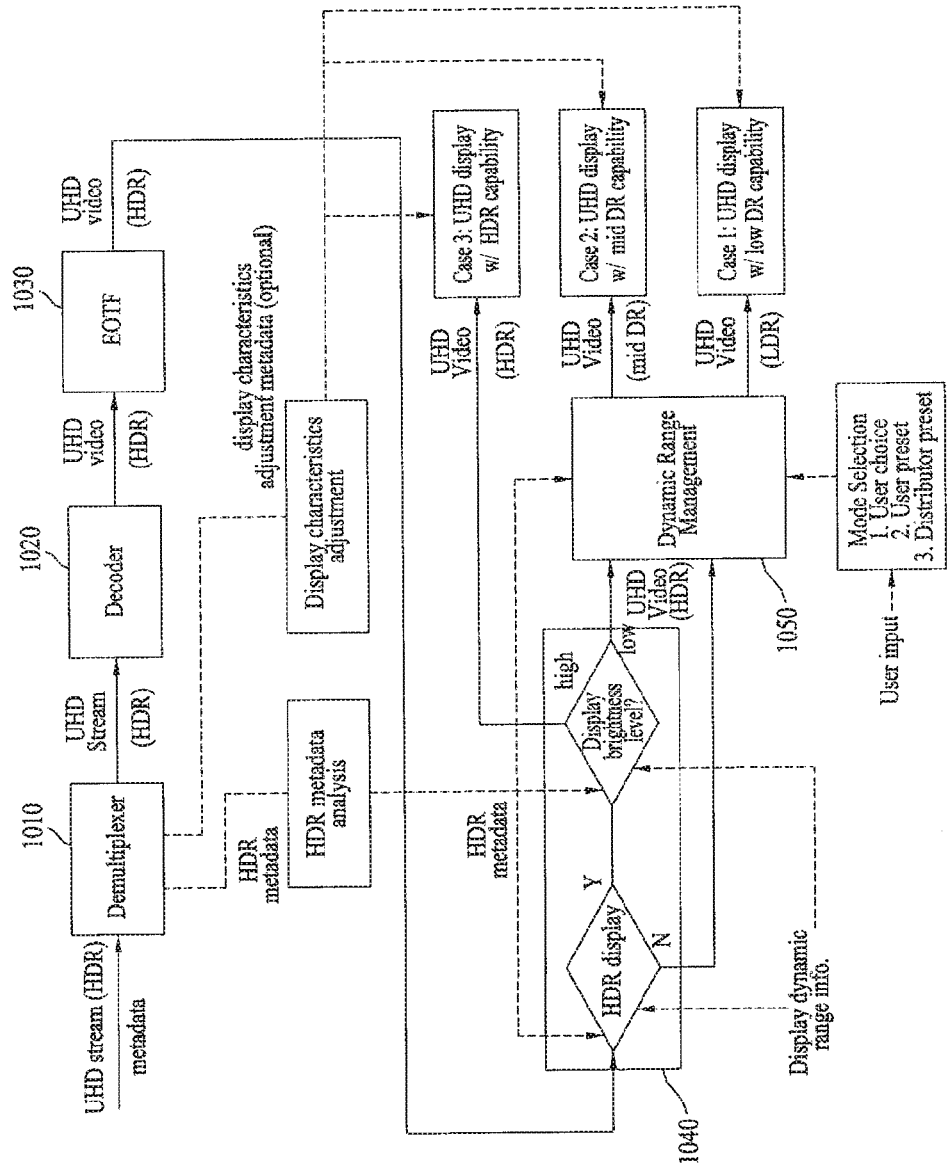
FIG. 22 is a diagram showing the workflow of a UHD broadcast signal reception device according to one embodiment of the present invention.

FIG. 22 is a diagram showing the workflow of a UHD broadcast signal reception device according to one embodiment of the present invention.

The UHD broadcast signal reception device according to one embodiment of the present invention may include a demultiplexer 1010, a decoder 1020, an electro optical transfer function (EOTF) unit 1030, a categorization unit 1040 and/or a controller 1050.

The demultiplexer 1010 may include a receiver (not shown). The receiver may receive UHD broadcast content and receive high dynamic range (HDR) metadata. The HDR metadata may indicate information on a method for transforming the UHD broadcast content to suit a display characteristics of a reception device and brightness information of the UHD broadcast content. The demultiplexer may demultiplex the multiplexed UHD stream into elementary streams. For example, a unit stream may include a video unit stream for transmitting video data, an audio unit stream for transmitting audio data, etc. The HDR metadata may be multiplexed with UHD media data and may be received as one UHD broadcast stream. In this case, the demultiplexer may demultiplex the multiplexed UHD broadcast stream into unit streams and/or display information metadata.

The decoder 1020 may decode media data transmitted by the demultiplexed unit streams and/or display information metadata. The media data transmitted by the unit streams may include UHD video data.

The EOTF unit 1030 may perform an appropriate operation according to a transfer curve used in an encoding process with respect to the decoded UHD video data. At this time, in addition to an existing EOTF, an EOTF suitable for HDR may be used and arbitrary EOTF may be newly defined and used. Examples of the existing EOTF may include gamma transformation described in ITU-R BT. 1886. Examples of the EOTF suitable for HDR may include perceptual quantization. As the arbitrary EOTF, a new-EOTF may be used. Information on the EOTF used in the EOTF unit may be transmitted via a voice user interface (VUI) message or metadata. The information on the EOTF may be included in the HDR metadata according to one embodiment of the present invention and transmitted, which will be described in detail below. The EOTF unit may perform the EOTF according to the workflow of the reception device after the processing procedure of the controller or during the processing procedure of the controller. As shown in this figure, in the operation of the reception device according to one embodiment of the present invention, transformation in linear luminance gradation is assumed. Accordingly, the reception device according to one embodiment of the present invention performs the EOTF just after decoding. Here, the EOTF is a transformation function indicating a relationship between the digital input value and output brightness value of the display or a relationship between the input brightness value and output digital value of the display.

The categorization unit 1040 may compare expressible dynamic range (DR) information of the display of the reception device according to one embodiment of the present invention and DR information of the UHD broadcast content received via the UHD metadata and determine whether content transformation is necessary. Here, the expressible DR information of the display of the reception device may include a highest value, a lowest value and a bit depth of the expressible dynamic range of the reception device. Here, the DR information of the UHD broadcast content may include highest reference brightness information indicating expressible highest reference brightness of the UHD broadcast content, lowest reference brightness information indicating expressible lowest reference brightness of the UHD broadcast content, and a bit depth. The categorization unit may categorize the display characteristics of the reception device according to a predetermined criterion. According to one embodiment of the present invention, the display characteristics of the reception device may be categorized into a display having an existing dynamic range (case 1), a display which has a dynamic range wider than an existing dynamic range but does not accommodate the dynamic range of the UHD broadcast content (case 2) and a display having a dynamic range wider than the dynamic range of the UHD broadcast content (case 3). The predetermined criterion for categorizing the display characteristics of the reception device and the existing dynamic range will be described in detail below.

The controller 1050 may transform the UHD broadcast content to suit the display characteristics of the reception device according to one embodiment of the present invention. In addition, the controller may transform the UHD broadcast content to suit the display characteristics of the reception device according to one embodiment of the present invention, which is categorized by the categorization unit. The controller may divide the dynamic range of the UHD broadcast content according to a predetermined criterion and transform the UHD broadcast content using different types of transformation methods according to ranges. The criterion for categorizing the dynamic range of the content will be described below. The controller may transform the UHD broadcast content using the received HDR metadata when the display characteristics of the reception device according to one embodiment of the present invention correspond to case 1 or case 2 and may not transform the UHD broadcast content when the display characteristics of the reception device according to one embodiment of the present invention correspond to case 3.

The UHD broadcast signal reception device according to one embodiment of the present invention may include a playback unit for playing UHD broadcast content back. The playback unit may play the content only in a specific dynamic range indicated by clipping dynamic range information of the entire dynamic range of the UHD broadcast content, if a clipping option is used.

A process of transforming the UHD broadcast content according to one embodiment of the present invention may be pre-specified as preset of TV by a viewer. In this case, the UHD broadcast content may be automatically transformed without a separate selection step. If content transformation is pre-specified as preset of TV, such settings may be maintained even when the channel is changed. Content transformation may be specified in a step of supplying UHD broadcast content. In this case, when the reception device supports content transformation, content may be automatically transformed without a separate selection step.

According to one embodiment of the present invention, the HDR metadata including brightness information of the UHD broadcast content may be received scene by scene.

According to one embodiment of the present invention, even in a scheduled viewing environment, UHD broadcast content having an HDR based on HDR metadata may be previously announced via an electronic program guide (EPG). In this case, a viewer may schedule transformation of specific content on the EPG. At this time, the reception device may store transformation of the specific content and automatically transform UHD broadcast content to suit the display characteristics of the reception device when the specific content is selected.

The reception device according to one embodiment of the present invention may store transformation related information of the content, which is broadcast via a current channel and transformed according to the display characteristics of the reception device, upon channel change, and play the content back using the stored transformation related information when returning to the current channel and continuing to broadcast the content.

The reception device according to one embodiment of the present invention may receive display information metadata necessary to control the display characteristics of the reception device to a display characteristics suitable for received UHD broadcast content. In this case, the reception device according to one embodiment of the present invention may control the display characteristics of the reception device to suit UHD broadcast content using received display information metadata.

FIG. 23 is a diagram showing a criterion for categorizing the display characteristics of the reception device according to one embodiment of the present invention.

The display characteristics of the UHD broadcast signal reception device according to one embodiment of the present invention may be categorized into a display having an existing dynamic range (case 1), a display which has a dynamic range wider than an existing dynamic range but does not accommodate the dynamic range of the UHD broadcast content (case 2) and a display having a dynamic range wider than the dynamic range of the UHD broadcast content (case 3).

The criterion for categorizing the display characteristics of the reception device according to one embodiment of the present invention may include maximum reference brightness information luminance_max indicating maximum reference brightness of the UHD broadcast content, essential maximum brightness information luminance_upper_bound indicating the maximum value of the essential dynamic range of the dynamic range of the UHD broadcast content and the maximum value max_display_brightness of the dynamic range expressible by the display of the UHD broadcast signal reception device.

Referring to this figure, the maximum value max_display_brightness of the dynamic range expressible by the display of the reception device is equal to or greater than a value obtained by adding a predetermined value (alpha) to the maximum reference brightness luminance_max of the content, the display of the reception device according to one embodiment of the present invention may correspond to case 3. If the condition of case 3 is not satisfied and the maximum value max_display_brightness of the dynamic range expressible by the display of the reception device is equal to or less than a value obtained by adding a predetermined value (beta) to essential maximum brightness luminance_upper_bound indicating the maximum value of the essential dynamic range of the content, the display of the reception device according to one embodiment of the present invention may correspond to case 1. If the conditions of case 3 and case 1 are not satisfied, the display of the reception device according to one embodiment of the present invention may correspond to case 2. Here, the existing dynamic range of display having the existing dynamic range (case 1) may mean a range less than a value obtained by adding the predetermined value (beta) to the essential maximum brightness luminance_upper_bound indicating the maximum value of the essential dynamic range of the content. In this figure, the alpha and beta values may be pre-set by referring to the characteristics of the UHD broadcast content and the display of the reception device according to one embodiment of the present invention or may be additionally transmitted.

According to one embodiment of the present invention, the alpha and beta as the predetermined values may be set to 0. In this case, the display characteristics of the reception device according to one embodiment of the present invention may be categorized into a first case (case 1) in which the maximum value of the dynamic range expressible by the display of the reception device is equal to or less than the value indicated by the essential maximum brightness information, a second case (case 2) in which the maximum value of the dynamic range expressible by the display of the reception device is greater than the value indicated by the essential maximum brightness information and is less than the value indicated by the maximum reference brightness information, and a third case (case 3) in which the maximum value of the dynamic range expressible by the display of the reception device is equal to or greater than the maximum reference brightness information.

According to one embodiment of the present invention, as the criterion for categorizing the display characteristics of the UHD broadcast signal reception device, the maximum reference brightness information, the essential maximum brightness information and the maximum value of the dynamic range expressible by the display of the reception device may be used. Here, the maximum value of the dynamic range is used as the criterion because the percentage of a high luminance component (bright part) is relatively high in HDR video as compared to low dynamic range (LDR) video. However, as necessary, a low luminance component (dart part) may be used as the criterion for categorizing the display characteristics of the UHD broadcast signal reception device. In this case, minimum reference brightness information luminance_min indicating minimum reference brightness of UHD broadcast content, essential minimum brightness information luminance_lower_bound indicating the minimum value of the essential dynamic range of the dynamic range of the UHD broadcast content and the minimum value min_display_brightness of the dynamic range expressible by the display of the UHD broadcast signal reception device.

The criterion used to categorize the display characteristics of the reception device according to one embodiment of the present invention may be included in the HDR metadata and transmitted.

FIG. 24 is a diagram showing a video processing procedure of UHD broadcast content according to one embodiment of the present invention.

The video processing procedure of the UHD broadcast content according to one embodiment of the present invention may include EOTF step S3010, display dynamic range categorization step S3020, display adaptive dynamic range transformation step S3030 and/or quantization step S3040.

In the EOTF step S3010, the decoded UHD video data may be transformed using the EOTF. For a detailed description of the EOTF, refer to the description of the EOTF unit 1030 of the reception device according to the embodiment of the present invention.

In the display dynamic range categorization step S3020, the display characteristics of the reception device according to one embodiment of the present invention may be categorized into a display having an existing dynamic range (case 1), a display which has a dynamic range wider than an existing dynamic range but does not accommodate the dynamic range of the UHD broadcast content (case 2) and a display having a dynamic range wider than the dynamic range of the UHD broadcast content (case 3). For a detailed description thereof, refer to the description of the categorization unit 1040 of the reception device according to the embodiment of the present invention. Hereinafter, in the present specification, operation of the reception device according to one embodiment of the present invention will be described in the categorized display characteristicss (case 1, cane 2 and case 3) of the reception device.

In the display adaptive dynamic range transformation step S3030, the controller of the reception device according to one embodiment of the present invention may transform the dynamic range (DR) of the received UHD broadcast content in consideration of the display characteristics of the reception device. Hereinafter, the display characteristicss of the reception device categorized in the dynamic range categorization steps S3020 will be described.

If the UHD broadcast signal reception device according to one embodiment of the present invention has the display having the existing dynamic range (case 1), the DR of the display may not sufficiently accommodate the DR of the content. In this case, the content may be transformed according to producer's intention in consideration of the characteristics of the reception device using the following transformation methods.

According to one embodiment of the present invention, a clipping option may be used for transformation of the UHD broadcast content. The clipping option refers to an option for disabling display of a brightness component greater or less than a predetermined value. The clipping method may be used when it is determined that the brightness components of content are concentrated in a predetermined range and it is determined that the best option is not to perform transformation when playing the content back on the display of the reception device. Clipping flag information clipping_flag included in the HDR metadata may be set to 1 to indicate that the clipping option is available. If the clipping flag information clipping_flag is 1, clipping dynamic range information luma_clipping_upper_bound or luma_clipping_lower_bound which is a digital value of the brightness of an area to be played back on the display of the reception device without separate transformation may be signaled. The clipping dynamic range information may be included in the HDR metadata and transmitted. If the clipping option is used, a problem occurring due to saturation artifacts of content is reduced even after using the clipping option. In addition, if the DR to be expressed by the UHD broadcast content, that is, the DR to be played back on the display of the reception device without separate transformation luma_clipping_upper_bound or luma_clipping_lower_bound, and the bit depth of the UHD broadcast content are equal to the DR and bit depth of the display of the reception device, information on the mid DR of the content may be maximally expressed on the display of the reception device.

According to one embodiment of the present invention, for transformation of the UHD broadcast content, a linear dynamic range transformation method may be used. Linear dynamic range transformation refers to a method of linearly mapping the entire DR of content as a method of using a transformation equation predetermined by a UHD broadcast content producer. Linear mapping flag information linear_mapping_flag included in the HDR metadata may be set to 1 to indicate that the linear dynamic range transformation method is used. In addition, the essential maximum brightness information and the maximum reference brightness information included in the HDR metadata are set to the same value, the essential minimum brightness information and the minimum reference brightness information are set to the same value and the transformation curve type information for identifying the type of the transformation curve used in the mid dynamic range is set to 0x00, thereby indicating that the linear dynamic range transformation method is used. The essential maximum brightness information, the maximum reference brightness information, the essential minimum brightness information, the minimum reference brightness information, the mid dynamic range and the transformation curve type information will be described below.

According to one embodiment of the present invention, for transformation of UHD broadcast content, an adaptive dynamic range transformation method may be used. Adaptive dynamic range transformation refers to a method of differently applying a transformation equation predetermined by a UHD broadcast content producer according to areas. In order to support various dynamic ranges of the display of the UHD broadcast signal reception device according to one embodiment of the present invention, the DR of the UHD broadcast content may be categorized into three area. The DR of the UHD broadcast content may be categorized into a mid dynamic range area indicating an area between the essential minimum brightness information luminance_lower_bound and the essential maximum brightness information luminance_upper_bound, an upper dynamic range area indicating an area between the essential maximum brightness information luminance_upper_bound and the maximum reference brightness information luminance_max and a lower dynamic range area indicating an area between the minimum reference brightness information luminance_min and the essential minimum brightness information luminance_lower_bound. Here, the mid dynamic range area may be referred to as a mid area, the upper dynamic range area may be referred to as an upper area and the lower dynamic range area may be referred to as a lower area. The percentages of the categorized areas in the DR of the display of the reception device may be transmitted. The mid dynamic range area percentage mid_DR_percentage and the upper dynamic range area percentage upper_DR_percentage may be transmitted to set brightness according to areas of the display via calculation. Here, the lower brightness area percentage may be calculated by subtracting the mid dynamic range area percentage and the upper dynamic range area percentage from 100. In order to reflect producer's intention to the transformation process of the adaptive dynamic range method according to one embodiment of the present invention, information for categorizing the dynamic range of content luminance_upper_bound and luminance_lower_bound, information on the categorized areas luma_upper_value and luma_lower_value and information on transformation equations of the categorized areas mid_DR_transformation_curve_type, upper_DR_transformation_curve_type and lower_DR_transformation_curve_type may be transmitted via high dynamic range metadata. Here, the essential minimum brightness information luminance_lower_bound, the essential maximum brightness information luminance_upper_bound, the maximum reference brightness information luminance_max, the minimum brightness information luminance_lower_bound and the mid dynamic range area percentage mid_DR_percentage and the upper_DR_percentage will be described in detail below.

When the UHD broadcast signal reception device according to one embodiment of the present invention has a wider DR than an existing DR but cannot accommodate the DR of UHD broadcast content (case 2), content may be transformed using the following transformation methods in consideration of the characteristics of the reception device and the intention of the producer.

According to one embodiment of the present invention, similarly to the case in which the UHD broadcast signal reception device has a display having an existing dynamic range (case 1), a clipping option may be used for transformation of UHD broadcast content. For this, refer to the above description of clipping in case 1.

According to one embodiment of the present invention, similarly to the case in which the UHD broadcast signal reception device has a display having an existing dynamic range (case 1), a linear dynamic range transformation method may be used for transformation of UHD broadcast content. For this, refer to the description of the linear dynamic range transformation method in case 1. Additionally, if the UHD broadcast signal reception device has a wider DR than an the existing DR but cannot accommodate the DR of UHD broadcast content (case 2), a dynamic range difference value luminance_upper_bound_diff[i] considering an additional DR expressible by the display of the reception device may be transmitted to decide a linear dynamic range transformation area. Here, the dynamic range difference value luminance_upper_bound_idff[i] considering the additional DR may be included in the high dynamic range metadata and transmitted.

According to one embodiment of the present invention, similarly to the case in which the UHD broadcast signal reception device has a display having an existing dynamic range (case 1), an adaptive dynamic range transformation method may be used for transformation of UHD broadcast content. For this, refer to the description of the adaptive dynamic range transformation method in case 1. Additionally, if the UHD broadcast signal reception device according to one embodiment of the present invention has a wider DR than an existing DR but cannot accommodate the DR of UHD broadcast content (case 2), the adaptive dynamic range transformation method may use the DR wider than the existing dynamic range of case 1. Using additional area different information luminance_upper_bound_diff[i], changed mid dynamic range area percentage information mid_DR_percentage[i] and changed upper dynamic range area percentage information upper_DR_percentage[i], the transformation degree of the per-area dynamic range DR of the dynamic range of the content may be adjusted.

If the following inequality is satisfied, max_display_brightness<luminance_upper_bound+ luminance_upper_bound_diff[0]+ . . . +luminance_upper_bound_diff[*i*]

that is, if the maximum value max_display_brightness of the dynamic range expressible by the display of the UHD broadcast signal reception device is less than a value obtained by adding the additional area difference information luminance_upper_bound_diff[i] to the essential maximum brightness information luminance_upper_bound, the mid dynamic range area and/or the upper dynamic range area may be changed and thus a transformation curve applied to the changed area may be changed. Therefore, changed upper area transformation curve type information upper_DR_transformation_curve_type[i], changed upper area transformation curve detailed information upper_DR_transformation_curve( ), changed upper dynamic range area percentage information upper_DR_percentage[i] and/or changed mid dynamic range area percentage information mid_DR_percentage[i] are newly applicable. The additional area difference information, the changed upper area transformation curve type information upper_DR_transformation_curve_type[i], the changed upper area transformation curve detailed information upper_DR_transformation_curve( ), the changed upper dynamic range area percentage information upper_DR_percentage[i] and/or the changed mid dynamic range area percentage information mid_DR_percentage[i] will be described in detail below.

If the UHD broadcast signal reception device according to one embodiment of the present invention has a wider DR than that of the existing device but cannot accommodate the DR of UHD broadcast content (case 2), as compared to the existing DR of the general display, the entire output dynamic range is increased due to the added DR. At this time, if the changed mid dynamic range area percentage information mid_DR_percentage[i] is similar to that of the existing case rather than the changed upper dynamic range area percentage information upper_DR_percentage[i], this means that the mid dynamic area information is indicated in detail. If the changed upper dynamic range area percentage information upper_DR_percentage[i] is increased, this means that brightness information of a high luminance component is indicated in greater detail.

If the DR of the display of the UHD broadcast signal reception device according to one embodiment of the present invention sufficiently accommodates the DR of UHD broadcast content (case 3), the UHD broadcast content may be played back without a separate transformation process.

In quantization step S3040, the UHD broadcast content transformed to have a DR suitable for the display of the reception device according to one embodiment of the present invention may be quantized to suit the bit depth of the display.

The video processing procedure of the UHD broadcast content according to one embodiment of the present invention may further include a display characteristics adjustment step and a playback (display) step. In the display characteristics adjustment step, the display characteristics of the reception device may be adjusted to suit the display characteristics intended by the UHD broadcast content producer. Information on the display characteristics intended by the content producer may be provided via metadata and the UHD broadcast signal reception device according to one embodiment of the present invention may adjust the display characteristics using the information on the display characteristics. In the playback (display) step, content with a DR changed to suit the intention of the producer of the UHD broadcast content and the display characteristics of the reception device may be provided to a viewer. If the UHD broadcast signal reception device according to one embodiment of the present invention sufficiently accommodates the DR of UHD broadcast content (case 3), original content may be provided to a viewer without separate transformation.

FIG. 25 is a diagram showing a clipping option and a linear dynamic range transformation method according to one embodiment of the present invention.

In this figure, the x-axis denotes the DR of UHD broadcast content according to one embodiment of the present invention and the y-axis denotes a DR expressible by the display of a UHD broadcast reception device according to one embodiment of the present invention. The input dynamic range may be the DR of content before transformation of the DR and the output dynamic range may be the DR of content transformed according to the DR expressible by the display of the reception device.

The curve having a larger gradient between two transformation curves shown in this figure may indicate the case of using the clipping option and the curve having a smaller gradient may indicate the case of using the linear dynamic range transformation method.

Figure 26:
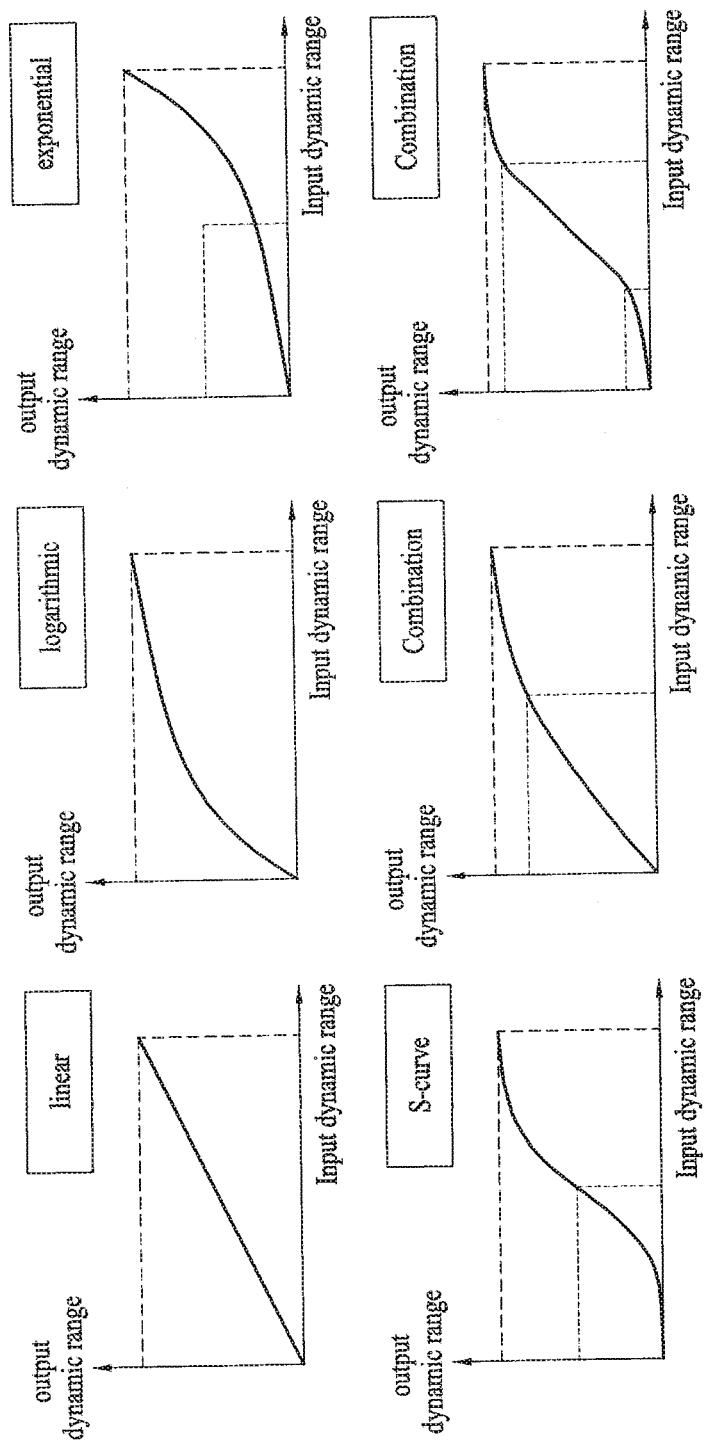
FIG. 26 is a diagram showing the types of transformation curves transmitted via high dynamic range metadata according to one embodiment of the present invention.

FIG. 26 is a diagram showing the types of transformation curves transmitted via high dynamic range metadata according to one embodiment of the present invention.

According to one embodiment of the present invention, in a process of transforming UHD broadcast content to suit the display characteristics of the UHD broadcast signal reception device, a specific transformation equation pre-selected by the producer may be used. In the transformation equation used to transform content, as shown in this figure, a linear curve, an exponential curve, an S curve, a logarithmic curve, a combination curve and a look up table (LUT) may be used. An optimal transformation curve selected by the producer may be transmitted mid area transformation curve detailed information mid_DR_transformation_curve( ), upper area transformation curve detailed information upper_DR_transformation_curve( ) and lower area transformation curve detailed information lower_DR_transformation_curve( ).

Figure 27:
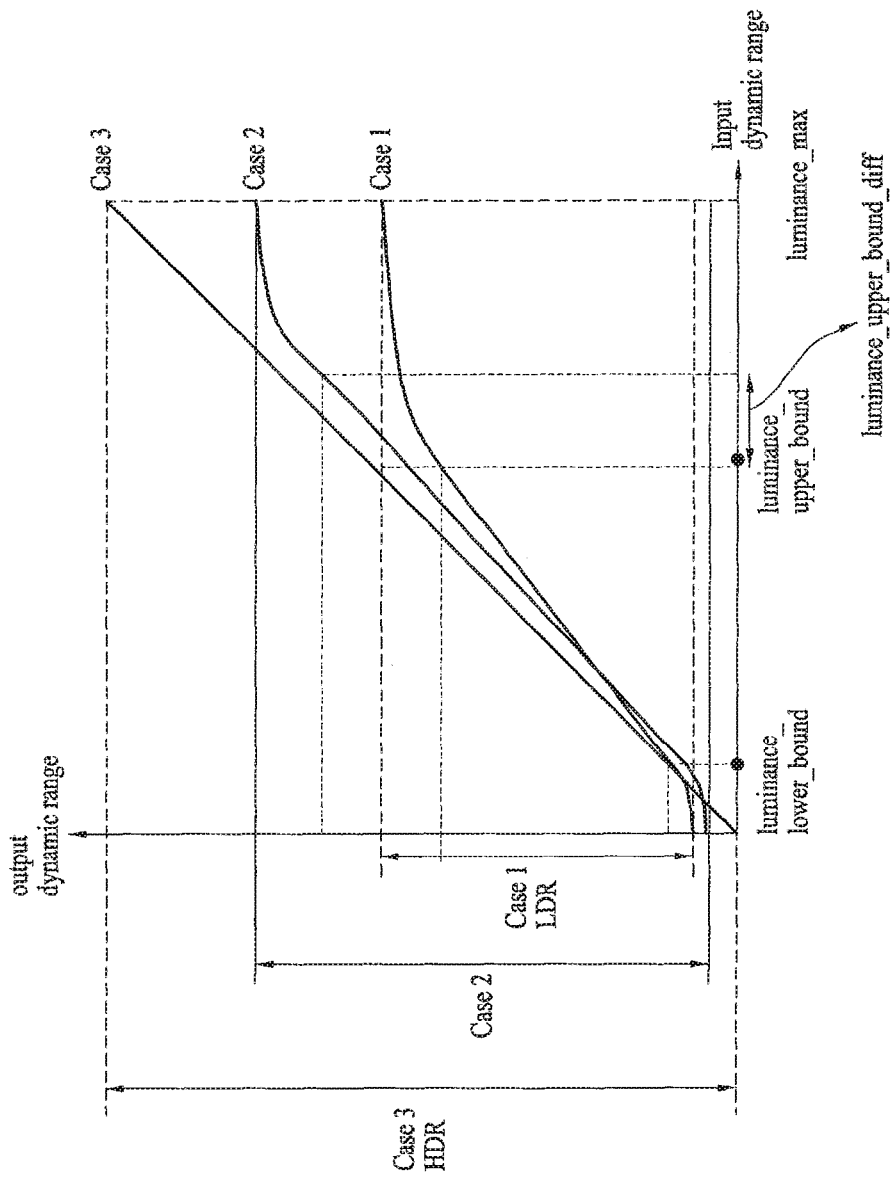
FIG. 27 is a diagram showing an adaptive dynamic range transformation method according to categorization of the display of the UHD broadcast signal reception device according to one embodiment of the present invention.

FIG. 27 is a diagram showing an adaptive dynamic range transformation method according to categorization of the display of the UHD broadcast signal reception device according to one embodiment of the present invention.

The display characteristics of the UHD broadcast signal reception device according to one embodiment of the present invention may be categorized according to a predetermined criterion. The display characteristics of the UHD broadcast signal reception device may be categorized into a display having an existing dynamic range (case 1), a display which has a dynamic range wider than an existing dynamic range but does not accommodate the dynamic range of the UHD broadcast content (case 2) and a display having a dynamic range wider than the dynamic range of the UHD broadcast content (case 3). For categorization of the display characteristics, refer to the description of the categorization unit of the UHD broadcast signal reception device.

In this figure, the x-axis indicates an input dynamic range and the y-axis indicates an output dynamic range. When the DR of UHD broadcast content is received as the input dynamic range, the DR of the UHD broadcast signal reception device may be output as the output dynamic range via a transmission process.

The essential minimum brightness information luminance_lower_bound shown in this figure may indicate the minimum value of an essential dynamic range of the dynamic range of the UHD broadcast content. The essential maximum brightness information luminance_upper_bound may indicate the maximum value of the essential dynamic range of the dynamic range of the UHD broadcast content. The essential maximum brightness difference information luminance_upper_bound_diff indicating the value added to the value of the essential maximum brightness information luminance_upper_bound may be used to extend the mid dynamic range area of the content if the UHD broadcast content is transformed to suit the display which has the DR wider than the existing dynamic range but does not accommodate the DR of the UHD broadcast content. That is, in case 2, the mid dynamic range area of the UHD broadcast content may be extended by the value indicated by the essential maximum brightness difference information luminance_upper_bound_diff. As a result, in case 2, the mid dynamic range area may indicate an area between the value of the essential minimum brightness information luminance_lower_bound and the value obtained by adding the value of the essential maximum brightness difference information luminance_upper_bound_diff to the value of the essential maximum brightness information luminance_upper_bound. The maximum reference brightness information luminance_max may indicate the maximum reference brightness of the UHD broadcast content, the minimum reference brightness information luminance_min may indicate the minimum reference brightness of the UHD broadcast content and the minimum reference brightness information may indicate the value of the location of the origin in the graph although not shown in this figure.

Referring to this figure, according to one embodiment of the present invention, since the display of case 3 can express a wider DR than that of the UHD broadcast content, a linear transformation curve having a gradient of 1 may be used in the entire input dynamic range. According to one embodiment of the present invention, the display of case 2 uses a linear transformation curve in an extended mid dynamic range area and uses an exponential curve or a logarithmic curve in a lower dynamic range area and an upper dynamic range area changed by the essential maximum brightness difference information luminance_upper_bound_diff. According to one embodiment of the present invention, the display of case 1 may use a linear curve in the mid dynamic range area and use an exponential curve or a logarithmic curve in a lower dynamic range area and an upper dynamic range area. In this figure, as the transformation curve used in each area of the input dynamic range, any one of a linear curve, an exponential curve, an S curve, a logarithmic curve, a combination curve and a look up table (LUT) may be used. For the mid dynamic range area, the lower dynamic range area and the upper dynamic range area, refer to the description of the video processing procedure of the UHD broadcast content.

FIG. 28 is a diagram showing the structure of a supplemental enhancement information (SEI) message according to one embodiment of the present invention.

High dynamic range metadata (dynamic range transformation info(payloadSize) according to one embodiment of the present invention may be included in payload of a packet for transmitting the SEI message and transmitted.

FIG. 29 is a diagram showing high dynamic range transformation info(payloadSize) included and transmitted in an SEI message according to one embodiment of the present invention.

High dynamic range (HDR) metadata according to one embodiment of the present invention indicates metadata indicating information on a method for transforming UHD broadcast content to suit the display characteristics of the UHD broadcast signal reception device and brightness information of UHD broadcast content. The HDR metadata may be referred to as dynamic range transformation information, dynamic range transformation info(payloadSize) or dynamic_range_transformation_metadata( ).

The HDR metadata according to one embodiment of the present invention may include maximum reference brightness information luminance_max, minimum reference brightness information luminance_in, arbitrary EOTF information private_EOTF, number-of-EOTF-coefficient information number_of_coeff, EOTF coefficient information transfer_curve_coeff[i], clipping flag information clipping_flag, linear mapping flag information linear_mapping_flag, clipping maximum dynamic range information luma_clipping_upper_bound, clipping minimum dynamic range information luma_clipping_lower_bound, essential maximum brightness information luminance_upper_bound, essential minimum brightness information luminance_lower_bound, essential maximum digital value luma_upper_value, essential minimum brightness digital value luma_lower_value, mid area transformation curve type information mid_DR_transformation_curve_type, mid area transformation curve detailed information mid_DR_transformation_curve, mid dynamic range area percentage information mid_DR_percentage, upper area transformation curve type information upper_DR_transformation_curve_type, upper area transformation curve detailed information upper_DR_transformation_curve( ), upper dynamic range area percentage information upper_DR_percentage, lower area transformation curve type information lower_DR_transformation_curve_type, lower area transformation curve detailed information lower_DR_transformation_curve, number-of-additional-area information number_luminance_upper_bound_diff, additional area difference information luminance_upper_bound_diff[i], additional area difference digital value luma_upper_value_diff[i], changed upper area transformation curve type information upper_DR_transformation_curve_type[i], changed upper area transformation curve detailed information upper_DR_transformation_curve( ), changed upper dynamic range area percentage information upper_DR_percentage[i] and/or changed mid dynamic range area percentage information mid_DR_percentage[i].

The maximum reference brightness information luminance_max indicates the maximum reference brightness of UHD broadcast content, that is, the maximum value of the DR. For example, the maximum reference brightness of a reference monitor is 100 cd/m^2. In this case, in consideration of a general range, 1 which is the quotient of the above value divided by 100 (decimal number) may be transmitted.

The minimum reference brightness information luminance_min indicates the minimum reference brightness of UHD broadcast content, that is, the minimum value of the DR. For example, the maximum reference brightness of a reference monitor is 0.05 cd/m^2. In this case, in consideration of a general range, 5 obtained by multiplying the above value by 100 (decimal number) may be transmitted.

The arbitrary EOTF information private_EOTF indicates whether an arbitrary EOTF function is used. In general, if a widely used EOTF such as ITU-R BT.1886, REC.709 or BT.2020 is used, this may be delivered by VUI information. However, if a non-standardized EOTF is used, this field value may be set to 1. For example, perceptual quantization may be used as the non-standardized EOTF, that is, an arbitrary EOTF.

The number-of-EOTF-coefficient information number_of_coeff indicates the number of coefficients used for an arbitrary EOTF.

The EOTF coefficient information transfer_curve_coeff[i] indicates the coefficient used for an arbitrary EOTF.

The clipping flag information clipping_flag indicates whether a clipping option is used and may have a value of 1 if use of the clipping option is permitted.

The linear mapping flag information linear_mapping_flag indicates whether a linear dynamic range transformation method is used and has a value of 1 if the linear dynamic range method is used.

The clipping maximum dynamic range information luma_clipping_upper_bound indicates the digital value of an upper bound in the DR of the display if the clipping option is used.

The clipping minimum dynamic range information luma_clipping_lower_bound indicates the digital value of a lower bound in the DR of the display if the clipping option is used.

The essential maximum brightness information luminance_upper_bound indicates a maximum value of an essential DR of the DR of the UHD broadcast content (in nits). The essential maximum brightness information may become a criterion for determining the type of the display of the reception device. In addition, a separate criterion for determining the type of the display of the reception device may be signaled.

The essential minimum brightness information luminance_lower_bound indicates a minimum value of an essential DR of the DR of the UHD broadcast content (in nits). The essential minimum brightness information may become a criterion for determining the type of the display of the reception device. In addition, a separate criterion for determining the type of the display of the reception device may be signaled.

The essential maximum digital value luma_upper_value indicates a digital value corresponding to the essential maximum brightness information luminance_upper_bound.

The essential minimum brightness digital value luma_lower_value indicates a digital value corresponding to the essential minimum brightness information luminance_lower_bound.

The mid area transformation curve type information mid_DR_transformation_curve_type identifies a dynamic range transformation curve used for a mid dynamic range area. The transformation curve may be any one of a linear curve, an exponential curve, an S curve, a logarithmic curve, a combination curve and a look up table (LUT).

The mid area transformation curve detailed information mid_DR_transformation_curve( ) indicates additional information of the transformation curve identified by the mid area transformation curve type information mid_DR_transformation_curve_type. For example, gradient information may be transmitted if a linear curve is used, information on a base may be transmitted if an exponential curve or a logarithmic curve is used, information on a base and y-intercept and coordinates of an intersection may be transmitted if an S curve is used, and information on an x coordinate of each area, a curve type of each area and a graph may be transmitted if a combination curve is used.

The mid dynamic range area percentage information mid_DR_percentage indicates a percentage of a mid dynamic range area of the dynamic range of UHD broadcast content in the entire dynamic range DR of the display of the reception device.

The upper area transformation curve type information upper_DR_transformation_curve_type identifies a dynamic range transformation curve used for an upper dynamic range area. The transformation curve may be any one of a linear curve, an exponential curve, an S curve, a logarithmic curve, a combination curve and a look up table (LUT).

The upper area transformation curve detailed information upper_DR_transformation_curve( ) indicates additional information of the transformation curve identified by the upper area transformation curve type information upper_DR_transformation_curve_type. For example, gradient information may be transmitted if a linear curve is used, information on a base may be transmitted if an exponential curve or a logarithmic curve is used, information on a base and y-intercept and coordinates of an intersection may be transmitted if an S curve is used, and information on an x coordinate of each section, a curve type of each section and a graph if a combination curve is used.

The upper dynamic range area percentage information upper_DR_percentage indicates a percentage of an upper dynamic range area of the dynamic range of UHD broadcast content in the entire dynamic range DR of the display of the reception device.

The lower area transformation curve type information lower_DR_transformation_curve_type identifies a dynamic range transformation curve used for a lower dynamic range area. The transformation curve may be any one of a linear curve, an exponential curve, an S curve, a logarithmic curve, a combination curve and a look up table (LUT).

The lower area transformation curve detailed information lower_DR_transformation_curve( ) indicates additional information of the transformation curve identified by the lower area transformation curve type information lower_DR_transformation_curve_type. For example, gradient information may be transmitted if a linear curve is used, information on a base may be transmitted if an exponential curve or a logarithmic curve is used, information on a base and y-intercept and coordinates of an intersection may be transmitted if an S curve is used, and information on an x coordinate of each area, a curve type of each area and a graph if a combination curve is used.

The number-of-additional-area information number_luminance_upper_bound_diff indicates the number of variables used to extend the mid dynamic range area.

The additional area difference information luminance_upper_bound_diff[i] indicates a difference value configuring an (i+1)-th brightness value in UHD broadcast content. In the display which has a dynamic range wider than an existing dynamic range but does not accommodate the dynamic range of the UHD broadcast content (case 2), if the mid dynamic range area is extended, the essential maximum brightness information luma_upper_value may be changed to a value indicated by luminance_upper_bound+luminance_upper_bound_diff[0]+ . . . +luminance_upper_bound_diff[i].

The additional area difference digital value luma_upper_value_diff[i] indicates a digital value of an (i+1)-th brightness value in UHD broadcast content. In the display which has a dynamic range wider than an existing dynamic range but does not accommodate the dynamic range of the UHD broadcast content (case 2), if the mid dynamic range area is extended, the essential maximum brightness digital value luma_upper_value may be changed to a value indicated by luma_upper_value+luma_upper_value_diff[0]+ . . . +luma_upper_value_diff[i].

The changed upper area transformation curve type information upper_DR_transformation_curve_type[i] may identify a transformation curve used in the changed upper dynamic range area if an (i+1)-th dynamic range is supported. That is, the changed upper area transformation curve type information may identify a transformation curve in the changed upper dynamic range area if the mid dynamic range area is extended.

The changed upper area transformation curve detailed information upper_DR_transformation_curve( ) indicates additional information of the transformation curve identified by the changed upper area transformation curve type information upper_DR_transformation_curve_type[i]. That is, details of the transformation curve used in the changed upper dynamic range area if the (i+1)-th dynamic range is supported are indicated.

The changed upper dynamic range area percentage information upper_DR_percentage[i] indicates a percentage of the changed upper dynamic range area in the entire dynamic range of the display of the reception device if the mid dynamic range area of UHD broadcast content is changed.

The changed mid dynamic range area percentage information mid_DR_percentage[i] indicates a percentage of the changed mid dynamic range area in the entire dynamic range of the display of the reception device if the mid dynamic range area of UHD broadcast content is changed.

The HDR metadata according to one embodiment of the present invention may further include EOTF type information EOTF_type and/or EOTF additional information EOTF_additional_info. The EOTF type information EOTF_type may indicate the type of the EOTF used by a content producer for optimal image quality of HDR content. Even when a plurality of EOTF standards is established or a content producer defines and uses an arbitrary EOTF, a receiver may identify the type of the used EOTF using the EOTF type information. The EOTF additional information EOTF_additional_info is used to deliver additional information of the used EOTF if additional information needs to be delivered according to the EOTF type information. For given EOTF type information, if the coefficients of a plurality of EOTF functions need to be delivered under various conditions, a transmitter may provide information on the coefficients using the EOTF additional information EOTF_additional_info. For example, if the coefficient of the EOTF function is changed according to various maximum brightness conditions of content, all the coefficients according to the maximum brightness conditions should be delivered. In this case, the above-described EOTF additional information may be used through a method of separately defining a field indicating the number of maximum brightness conditions of content in the above-described EOTF additional information and indicating target maximum brightness information EOTF_target_max_brightness and information on the coefficients EOTF_coefficient[i] of the EOTF function under each maximum brightness condition.

FIG. 30 is a diagram showing mid area transformation curve type information mid_DR_transformation_curve_type according to one embodiment of the present invention.

If the value of the mid area transformation curve type information mid_DR_transformation_curve_type is 0x00, this indicates that a linear curve is used as a transformation curve and, if the value of the mid area transformation curve type information mid_DR_transformation_curve_type is 0x02, this indicates that a logarithmic curve is used as a transformation curve. If the value of the mid area transformation curve type information mid_DR_transformation_curve_type is 0x03, this indicates that an S curve is used as a transformation curve and, if the value of the mid area transformation curve type information mid_DR_transformation_curve_type is 0x04, this indicates that a combination curve is used as a transformation curve. If the value of the mid area transformation curve type information mid_DR_transformation_curve_type is 0x05, this indicates that an LUT is used.

Although the mid area transformation curve type information is shown in this figure, the same is true in the upper area transformation curve type information upper_DR_transformation_curve_type and the lower area transformation curve type information lower_DR_transformation_curve_type.

FIG. 31 is a diagram showing transformation curve detailed information DR_transformation_curve according to one embodiment of the present invention.

The transformation curve detailed information DR_transformation_curve according to one embodiment of the present invention may include gradient information gradient, base information coeff_a, coeff_b, intersection coordinate information intersection_x, y-intercept information coeff_a2 number-of-combined-curves information num_section, transformation curve type information DR_transformation_curve_type[i], entry length information entry_length, entry input information in_value and entry output information out_value.

The gradient information gradient indicates the gradient of a linear curve if a linear curve is used as a transformation curve.

The base information coeff_a, coeff_b indicates the base of an exponential function or a logarithmic function if an exponential curve, an S curve and/or a logarithmic curve is used as a transformation curve.

The intersection coordinate information intersection_x indicates the coordinates of the intersection if an S curve is used as a transformation curve.

The y-intercept information coeff_a2 indicates a y-intercept value of each of curves located at both sides of an intersection if an S curve is used as a transformation curve.

The number-of-combined-curves information num_section indicates the number of combined curves if a combination curve is used as a transformation curve.

The transformation curve type information DR_transformation_curve_type[i] identifies the type of each of the combined curves if a combination curve is used as a transformation curve.

The entry length information entry_length indicates the length of an entry included in an LUT if an LUT is used for transformation of UHD broadcast content.

The entry input information in_value indicates a value input to an LUT if an LUT is used for transformation of UHD broadcast content.

The entry output information out_value indicates a value output from an LUT if an LUT is used for transformation of UHD broadcast content.

FIG. 32 is a diagram showing an event information table according to one embodiment of the present invention.

The event information table according to one embodiment of the present invention may include a table_id field, a section_syntax_indicator field, a private_indicator field, a section_length field, a source_id field, a version_number field, a current_next_indicator field, a section_number field, a last_section_number field, a protocol_version field, a num_events_in_section field, an event_id field, a start_time field, an ETM_location field, a length_in_seconds field, a title_length field, a title_text( ) field, a descriptors_length field, a descriptor( ) field and/or a CRC_32 field.

The table_id field identifies that the table is an EIT.

The section_syntax_indicator field is a 1-bit field, which is set to 1 to indicate the "long" form of an MPEG-2 private_section table.

The private_indicator field is a 1-bit field set to 1.

The section_length field indicates the length of a table section following this field in bytes.

The source_id field indicates a source id of a virtual channel for transmitting an event described in this section.

The version_number field is a 5-bit field indicating the version number of the table.

The current_next_indicator field is a 1-bit field indicating that this table is currently or next applicable.

The section_number field indicates the number of the section.

The last_section_number field identifies the number of a last section.

The protocol_version field is a field having a function for allowing, in the future, a current table type for transmitting parameters different from those defined in the current protocol.

The num_events_in_section field indicates the number of events included in this table section.

The event_id field identifies a specific number indicated by the described event. Here, the specific number may function as a part of an event ETM_id.

The start_time field indicates the start time of the event in GPS seconds. The value indicating the start time of the event in the virtual channel may be greater than the value indicating the end time of the event which is being broadcast. The end time of the event may be defined as a sum of the start time of the event and a time value of the length of the event.

The ETM_location field indicates whether an extended text message for a channel, an event or a data event is present.

The length_in_seconds field indicates the duration of the event in seconds.

The title_length field indicates the length of the title text title_text. If the value of this field is 0, this indicates that there is no title in this event.

The title_text( ) field indicates the title of the event in the form of multiple string structures.

The descriptors_length field indicates the total length of a subsequently described event descriptor.

The descriptor( ) field is a descriptor loop located in the table. The descriptor loop may include an additional descriptor. 0 or more descriptors may be included in the EIT and the descriptor may correspond to an event level descriptor describing information applied to each event. The HDR metadata according to one embodiment of the present invention may be included in the event level descriptor and transmitted. If the HDR metadata according to one embodiment of the present invention is included in the event level descriptor and transmitted, the reception device may check whether dynamic range transformation metadata of content is included at an event level and the determine whether reception device may accommodate the content. The descriptor including the HDR metadata may be referred to as a dynamic range transformation information descriptor and a detailed description thereof will be given below. A UHD program information descriptor including information for identifying the type of a UHD service may be included in the EIT and transmitted and a detailed description thereof will be given below.

The CRC_32 field includes a CRC value for checking integrity of data. The CRC value may guarantee that a value of 0 is output from a register of a decoder defined in Annex A of ISO-13818-1 "MPEG-2 Systems" [13] after all EIT sections are processed.

FIG. 33 is a diagram showing a dynamic range transformation information descriptor dynamic_range_transformation_info_descriptor according to one embodiment of the present invention.

The dynamic range transformation information descriptor dynamic_range_transformation_info_descriptor according to one embodiment of the present invention may include a descriptor_tag field, a descriptor_length field, a number_of_HDR_info field and/or a dynamic_range_transformation_metadata( ) field.

The descriptor_tag field identifies that this descriptor is a dynamic range transformation descriptor.

The descriptor_length field indicates the length of this descriptor.

The number_of_HDR_info field indicates the number of HDR metadata included in this descriptor and may indicate the number of HDR modes intended by a producer if the content transformation method is changed scene by scene.

The dynamic_range_transformation_metadata( ) field indicates information on a method of transforming UHD broadcast content to suit the display characteristics of the UHD broadcast signal reception device and brightness information of UHD broadcast content. This field may be referred to as HDR metadata and a description thereof will be given below.

FIG. 34 is a diagram showing HDR metadata dynamic_range_transformation_metadata( ) included in the dynamic range transformation information descriptor dynamic_range_transformation_info_descriptor( ) according to one embodiment of the present invention.

The HDR metadata dynamic_range_transformation_metadata( ) according to one embodiment of the present invention may include maximum reference brightness information luminance_max, minimum reference brightness information luminance_min, essential maximum brightness information luminance_upper_bound, essential minimum brightness information luminance_lower_bound, number-of-additional-areas information number_luminance_upper_bound_diff and/or additional area difference information luminance_upper_bound_diff[i].

The HDR metadata dynamic_range_transformation_metadata( ) according to one embodiment of the present invention may further include arbitrary EOTF information private_EOTF, number-of-EOTF-coefficient information number_of_coeff, EOTF coefficient information transfer_curve_coeff[i], clipping flag information clipping_flag, linear mapping flag information linear_mapping_flag, clipping maximum dynamic range information luma_clipping_upper_bound, clipping minimum dynamic range information luma_clipping_lower_bound, essential maximum brightness information luminance_upper_bound, essential minimum brightness information luminance_lower_bound, essential maximum digital value luma_upper_value, essential minimum brightness digital value luma_lower_value, mid area transformation curve type information mid_DR_transformation_curve_type, mid area transformation curve detailed information mid_DR_transformation_curve( ), mid dynamic range area percentage information mid_DR_percentage, upper area transformation curve type information upper_DR_transformation_curve_type, upper area transformation curve detailed information upper_DR_transformation_curve( ), upper dynamic range area percentage information upper_DR_percentage, lower area transformation curve type information lower_DR_transformation_curve_type, lower area transformation curve detailed information lower_DR_transformation_curve, additional area difference digital value luma_upper_value_diff[i], changed upper area transformation curve type information upper_DR_transformation_curve_type[i], changed upper area transformation curve detailed information upper_DR_transformation_curve( ), changed upper dynamic range area percentage information upper_DR_percentage[i] and/or changed mid dynamic range area percentage information mid_DR_perentage[i].

For the information included in the HDR metadata dynamic_range_transformation_metadata( ) according to one embodiment of the present invention, refer to the description of the HDR metadata (dynamic range transformation info(payloadSize) included and transmitted in the SEI message.

The HDR metadata dynamic_range_transformation_metadata( ) according to one embodiment of the present invention may further include EOTF type information EOTF_type and/or EOTF additional information EOTF_additional_info. The EOTF type information EOTF_type may indicate the type of the EOTF used by a content producer for optimal image quality of HDR content. Even when a plurality of EOTF standards is established or a content producer defines and uses an arbitrary EOTF standard, a receiver may identify the type of the used EOTF using the EOTF type information. The EOTF additional information EOTF_additional_info is used to deliver additional information of the used EOTF if additional information needs to be delivered according to the EOTF type information. For given EOTF type information, if the coefficients of a plurality of EOTF functions need to be delivered under various conditions, a transmitter may provide information on the coefficients using the EOTF additional information EOTF_additional_info. For example, if the coefficient of the EOTF function is changed according to various maximum brightness conditions of content, all the coefficients according to the maximum brightness conditions should be delivered. In this case, and the above-described EOTF additional information may be used through a method of separately defining a field indicating the number of maximum brightness conditions of content in the above-described EOTF additional information and indicating target maximum brightness information EOTF_target_max_brightness and information EOTF_coefficient[i] on the coefficients of the EOTF function under each maximum brightness condition.

According to one embodiment of the present invention, a plurality of HDR metadata may be present in one event. That is, the HDR metadata is not consistently applied to one piece of UHD broadcast content but different metadata may be applied according to scene and transformed by another method. In this case, the display of the UHD broadcast signal reception device according to one embodiment of the present invention needs to determine whether UHD broadcast content is accommodated. Dynamic range information of UHD broadcast content and criterion information necessary to categorize the display of the reception device may be transmitted using the HDR metadata according to one embodiment of the present invention.

FIG. 35 is a diagram showing a UHD program information descriptor UHD_program_info_descriptor) according to one embodiment of the present invention.

The UHD program information descriptor UHD_program_info_descriptor( ) according to one embodiment of the present invention may include a descriptor_tag field, a descriptor_length field and/or a UHD_service_type field.

The descriptor_tag field identifies that this descriptor is a dynamic range transformation information descriptor.

The descriptor_length field indicates the length of this descriptor.

The UHD_service_type field may provide information on the type of a UHD service to provide various UHD services. For example, as the type of the UHD service, there are UHD1 (4K) and UHD2 (8K). In addition, the type of the UHD service may be categorized according to image quality and may be arbitrarily specified by a user.

FIG. 36 is a diagram showing a UHD_service_type field included in the UHD program information descriptor UHD_program_info_descriptor( ) according to one embodiment of the present invention.

If the value of the UHD_service_type field according to one embodiment of the present invention is 0000, this indicates a UHD1 service and, if the value of the UHD_service_type field according to one embodiment of the present invention is 0001, this indicates a UHD2 service. If the value of the UHD_service_type field according to one embodiment of the present invention is 1000 to 1111, this indicates a specific service specified by a user. For example, the user may set UHD_service_type to 1001 (color enhanced UHD1 (4K) service) to indicate that color enhancement is used.

According to one embodiment of the present invention. UHD_service_type may be set to 1001 (color enhanced UHD (4K) service) to indicate that the display characteristics may be adjusted using metadata. If UHD_service_type is 0000 (UHD1 service), presence/absence of the dynamic range transformation information descriptor dynamic_range_transformation_info_descriptor( ) in the EIT may be checked to determine whether UHD broadcast content may be transformed to suit the display of the reception device using metadata.

According to one embodiment of the present invention, using the dynamic range transformation information descriptor dynamic_range_transformation_info_descriptor( ), whether the dynamic range of content desired to be played back by a content provider may be expressed on the display of a viewer may be determined. Thereby, whether HDR metadata is used for content played back currently or in the future may be determined and a receiver may be pre-set for scheduled recording.

FIG. 37 is a diagram showing a terrestrial virtual channel table (TVCT) according to one embodiment of the present invention.

The terrestrial virtual channel table (TVCT) according to one embodiment of the present invention may include a tabled field, a section_syntax_indicator field, a private_indicator field, a section_length field, a transport_stream_id field, a version_number field, a current_next_indicator field, a section_number field, a last_section_number field, a protocol_version field, a num_channels_in_section field, a short_name field, a major_channel_number field, a minor_channel_number field, a modulation mode field, a carrier_frequency field, a channel_TSID field, a program_number field, an ETM_location field, an access_controlled field, a hidden field, a hide_guide field, a service_type field, a source_id field, a descriptors_length field and a descriptor( ) field.

The table_id field identifies a table. Since the table shown in FIG. 30 is a TVCT, the value of table_id is 0x08.

The section_syntax_indicator field is a 1-bit field, which is set to 1 to indicate the "long" form of the MPEG-2 private_section table. (This 1-bit field shall be set to '1' to always indicate the "long" form of the MPEG-2 private_section table.)

The private_indicator field is a 1-bit field, which is set to 1. (This 1-bit field shall be set to '1'.)

The section_length field indicates the length of the table section following this field in bytes. (This is a 12-bit field, the first two bits of which shall be "00". It specifies the number of bytes of the section, starting immediately following the section_length field and including the CRC. The section_length shall not exceed 1021 so that the entire section has a maximum length of 1024 bytes.)

The transport_stream_id field indicates the identifier of an MPEG-2 transport stream (ST) included in the table. (To distinguish each transport stream within a single network (terrestrial, cable or satellite) from another, MPEG-2 established the use of a 16-bit (ranging from 0 to 65535) transport_stream_identifier, which is also called a TSID.)

The version_number field is a 5-bit field indicating the version number of the table. (This 5-bit field is the version number of the PSIP_section. The version_number shall be incremented by 1 modulo 32 when a change in the information carried within the PSIP_section occurs. When the current_next_indicator is set to '0', then the version_number shall be that of the next applicable PSIP_section with the same table_id, table_id_extension, and section_number.)

The current_next_indicator field is a 1-bit field indicating that this table is currently or next applicable. (A 1-bit field, which when set to '1' indicates that the PSIP_section sent is currently applicable. When the current_next_indicator is set to '1', then the version_number shall be that of the currently applicable PSIP_section. When the bit is set to '0', it indicates that the PSIP_section sent is not yet applicable and shall be the next PSIP_section with the same section_number, table_id_extension, and table_id to become valid.)

The section_number field indicates the number of the section. (This 8-bit field gives the number of the PSIP_section. The section-number of the first section in a PSIP table shall be 0x00. The section_number shall be incremented by 1 with each additional section in the PSIP table. The scope of the section_umber shall be defined by the table_id and table_id_extension. That is, for each PSIP table and value of the table_id_extension field, there is the potential for the full range of section_number values.)

The last_section_number field identifies the number of the last section. (This 8-bit field specifies the number of the last section (that is, the section with the highest section_number) of the PSIP table of which this section is a part. Its scope is the same as that of the section_number field.)

The protocol_version field is a field having a function for allowing, in the future, a current table type for transmitting parameters different from those defined in the current protocol. (An 8-bit unsigned integer field whose function is to allow, in the future, this table type to carry parameters that may be structured differently from those defined in the current protocol. At present, the only valid value for protocol_version is zero. Non-zero values of protocol_version may be used by a future version of this standard to indicate structurally different tables.)

The num_channels_in_section field indicates the number of virtual channel definitions (The num_channels_in_section field in ATSC Cable Virtual Channel table CVCT table sections is an eight-bit field that indicates the number of virtual channel definitions to follow in the table section.)

The short_name field is a 112-bit field indicating the short channel for the virtual channel. (The short_name field is a 112-bit field in ATSC CVCT table sections that gives the short_name for the virtual channel. Each letter of the short_name is formatted as a 16-bit Unicode character, with the high order byte transmitted first. Therefore, short_name for TVCT and CVCT entries is seven Unicode characters, which short_name for SVCT entries is eight Unicode characters. If the display name is less than the number of permitted characters, 0/0x00 is appended to the end until the allocated number of bits has been reached.)

The major_channel_number field indicates the number of major channels associated with the virtual channel. (A 10-bit number that represents the "major" channel number associated with the virtual channel being defined in this iteration of the "for" loop. Each virtual channel shall be associated with a major and a minor channel number. The major channel number, and the minor channel number, act as the user's reference number for the virtual channel. The major_channel_number shall be between 1 and 99. The value of major_channel_number shall be set such that in no case is a major_channel_number/minor_channel_number pair duplicated within the TVCT.)

The minor_channel_number field indicates the number of minor channels associated with the virtual channel. (A 10-bit number in the range 0 to 999 that represents the "minor" or "sub"-channel number. This field, together with major_channel_number, serves as a two-part channel number, where minor_channel_number represents the second or right-hand part of the number. When the service_type is analog television, minor_channel_number shall be set to 0.)

The modulation mode field indicates the modulation mode of the carrier carrying the virtual channel. (The modulation_mode is an eight-bit field in a virtual channel entry that informs receivers of the modulation mode used to transmit individual channels.)

The carrier_frequency field transmits carrier frequency information used by the transport carrying the virtual channel. (The carrier frequency is a 32-bit field that transmits the carrier frequency used by the transport carrying the virtual channel.)

The channel_TSID field indicates the MPEG-2 transport stream ID of the transport stream (TS) for transmitting the MPEG-2 program associated with the virtual channel. (The channel_TSID is a 16-bit unsigned integer that gives the transport_stream_id of the channel that carries (for inactive channels, will carry) the virtual channel.)

The program_number field identifies each program service or virtual channel in the TS. (The program_number is a 16-bit unsigned integer that uniquely identifies each program service (or virtual channel) present in a transport stream.)

ETM_location field indicates whether there is an extended text message for the channel, event or data event. (The ETM_location field denotes whether there is an extended text message for the channel (Channel Extended Text table or CETT), event (Event Extended Text table) or data event (Data Extended Text table).)

The access_controlled field indicates whether the event associated with this virtual channel may be controlled. (When access_controlled is set to '1', means that events associated with this virtual channel may be access controlled. When set to '0', access to the events is not controlled.)

The hidden field means whether this channel may be accessed by direct entry (or field, attribute or entity) of the virtual channel number. (When hidden is set to '1', means the channel cannot be accessed by direct entry of the virtual channel number. When set to '0', virtual can be accessed by direct entry.)

The hide_guide field indicates whether this channel may be accessed by direct entry (or field, attribute or entity) of the virtual channel number. (When hide_guide is set to '1', this means that the channel cannot be accessed by direct entry of the virtual channel number. When set to '0', virtual can be accessed by direct entry.)

The service_type identifies the service type set in the virtual channel. (The service_type is a 6-bit enumerated field that identifies the type of service set in the virtual channel.) As one embodiment of the UHD service, the service type may be set to parameterized service (0x07), extended parameterized service (0x09) or new DTV service (0x10). The above-described service name and value are exemplary and may have another name or value.

The source_id field is a 16-bit unsigned integer to indicate the programming source associated with the virtual channel. (A 16-bit unsigned integer that identifies the programming source associated with the virtual channel. In this context, a source is one specific source of video, text, data, or audio programming. Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.)

The descriptors_length field signals the length of the following descriptor field in bytes. (The descriptors_length is a 10-bit unsigned integer field that signals the length in bytes of the descriptor field to follow. If no descriptors are present, zero would be appropriate.)

The descriptor( ) field is a descriptor loop located in the table. The descriptor loop may include additional descriptors.

FIG. 38 is a diagram showing a descriptor capable of identifying a UHD broadcast service according to one embodiment of the present invention.

Whether UHD video is serviced in the TVCT according to one embodiment of the present invention may be signaled by the above-described method.

If service_type is 0x07, a video service may be described and whether the stream may be decoded and played back by the reception device may be determined using the information included in stream_info_details( ) transmitted via a component list descriptor. In addition, information on a UHD service may be provided via a UHD descriptor and/or a service location descriptor.

If service_type is 0x09, a parameterized service descriptor may be further used. Using this, detailed information on a UHD service may be provided. In addition, information on a UHD service may be provided via a component list descriptor and/or a service location descriptor.

If service_type is 0x10, information on a UHD service may be provided via a UHD descriptor and/or a service location descriptor.

Figure 39:
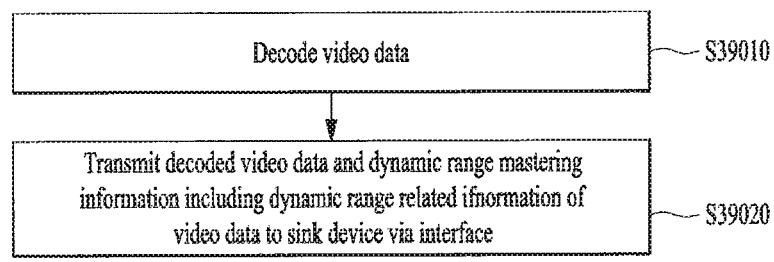
FIG. 39 is a diagram showing a video data processing method according to another embodiment of the present invention.

FIG. 39 is a diagram showing a video data processing method according to another embodiment of the present invention.

The video data processing method according to one embodiment of the present invention may include step S39010 of decoding video data and/or step S39020 of transmitting the decoded video data and dynamic range mastering information including dynamic range related information of the video data to a sink device via an interface. The dynamic range mastering information may include EOTF type information for identifying the EOTF used for the video data. The dynamic range mastering information was described above with reference to FIGS. 11, 12 and 14.

According to another embodiment of the present invention, the dynamic range mastering information may include information indicating maximum brightness of a mastering display and/or information indicating minimum brightness of the mastering display. Here, the information indicating maximum brightness of the mastering display may indicate Orig_white_luminance_level information and the Information indicating minimum brightness of the mastering display may indicate Orig_black_luminance_level information, both of which were described above with reference to FIGS. 11, 12 and 14.

According to another embodiment of the present invention, the dynamic range mastering information may include chromaticity coordinate information of the three primary colors and white color of the mastering display. Here, the chromaticity coordinate information of the three primary colors of the mastering display and/or the chromaticity coordinate information of the white color of the mastering display may be signaled using Orig_color_gamut, Red-x, Red-y, Green-x, Green-y, Blue-x, Blue-y, White-x and/or White-y fields, all of which were described above with reference to FIGS. 11, 12 and 14.

According to another embodiment of the present invention, the dynamic range mastering information may include additional information of the EOTF according to EOTF type information. Here, the additional information of the EOTF may include EOTF_additional_info and/or EOTF_Coefficient, both of which were described above with reference to FIGS. 11 and 14.

Figure 40:
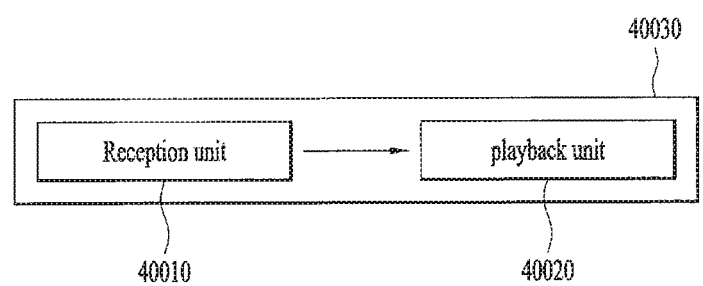
FIG. 40 is a diagram showing the configuration of a video data processing device according to one embodiment of the present invention.

FIG. 40 is a diagram showing the configuration of a video data processing device according to one embodiment of the present invention.

The video data processing device 40030 according to one embodiment of the present invention may include a reception unit 40010 and/or a playback unit 40020.

The reception unit may receive video data and dynamic range mastering information including dynamic range related information of the video data from a source device via an interface. The dynamic range mastering information may include EOTF type information for identifying the EOTF used for the video data.

The playback unit may play the received video data back.

The configuration of the video data processing device 40030 according to one embodiment of the present invention may perform the steps of the above-described video data processing method (FIG. 1). Each configuration may correspond to hardware or may be combined with hardware.

Figure 41:
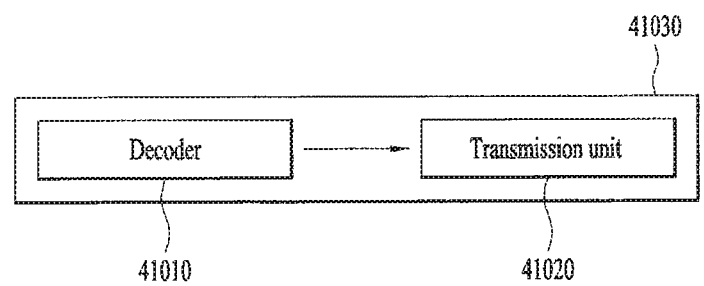
FIG. 41 is a diagram showing the configuration of a video data processing device according to another embodiment of the present invention.

FIG. 41 is a diagram showing the configuration of a video data processing device according to another embodiment of the present invention.

The video data processing device 41030 according to one embodiment of the present invention may include a decoder 41030 and/or a transmission unit 41020.

The decoder may decode video data.

The transmission unit may transmit the decoded video data and dynamic range mastering information including dynamic range related information of the video data to a sink device via an interface. The dynamic range mastering information may include EOTF type information for identifying the EOTF used for the video data.

The configuration of the video data processing device 41030 according to one embodiment of the present invention may perform the steps of the above-described video data processing method (FIG. 39). Each configuration may correspond to hardware or may be combined with hardware.

According to the embodiments of the present invention, it is possible to optimally view content including UHD content under various display device conditions.

According to the embodiments of the present invention, it is possible to reduce color or brightness restrictions according to the physical properties of display devices when content including UHD content is displayed on various display devices.

According to the embodiments of the present invention, it is possible to optimally view content including UHD content by delivering the properties of a display device even when content including the UHD content is supplied via an external device.

The modules, units or blocks according to the embodiments of the present invention may be processors/hardware for executing a series of processes stored in a memory (or a storage unit). The steps or methods described in the above-described embodiments may be performed by hardware/processors. The methods proposed by the present invention may be executed as code. The code may be written in a process-readable storage medium and thus may be read by a processor provided by an apparatus according to the embodiments of the present invention.

Although the description of the present invention is explained with reference to each of the accompanying drawings for clarity, it is possible to design new embodiment(s) by merging the embodiments shown in the accompanying drawings with each other. In addition, if a recording medium readable by a computer, in which programs for executing the embodiments mentioned in the foregoing description are recorded, is designed in necessity of those skilled in the art, it may be within the scope of the appended claims and their equivalents.

An apparatus and method according to the present invention are not limited by the configurations and methods of the embodiments mentioned in the foregoing description. In addition, the embodiments mentioned in the foregoing description can be configured in a manner of being selectively combined with one another entirely or in part to enable various modifications.

In addition, the video processing method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like and also include a carrier-wave type implementation such as transmission over the Internet. Furthermore, as the processor-readable recording medium is distributed to a computer system connected via network, processor-readable codes can be saved and executed in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both of the apparatus and method inventions may be complementarily applicable to each other.

Various embodiments have been described in the best mode for carrying out the invention.

The present invention is applicable to a series of broadcast service provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A video data processing method, in a sink device which receives uncompressed video data, comprising:
receiving the uncompressed video data and dynamic range mastering InfoFrame including dynamic range related information of the uncompressed video data from a source device which generates the uncompressed video data via an interface,
wherein the dynamic range mastering InfoFrame includes InfoFrame type code identifying a type of the dynamic range mastering InfoFrame,
wherein the dynamic range mastering InfoFrame includes electro optical transfer function (EOTF) type information for identifying an EOTF used in the uncompressed video data,
wherein the dynamic range mastering InfoFrame includes information indicating maximum brightness of the uncompressed video data; and
playing the uncompressed video data.

2. The video data processing method according to claim 1, the method further comprising:
transmitting extended display identification data (EDID) indicating capabilities of the sink device to the source device via an interface,
wherein the EDID includes EOTF information for identifying EOTF supported by the sink device,
wherein the dynamic range mastering InfoFrame is received when the EOTF information identifies at least one EOTF supported by the sink device,
wherein the dynamic range mastering InfoFrame includes information indicating maximum brightness of a mastering display that was used in mastering the uncompressed video data and information indicating minimum brightness of the mastering display.

3. The video data processing method according to claim 1, wherein the dynamic range mastering InfoFrame includes chromaticity coordinate information of three primary colors and white color of a mastering display.

4. The video data processing method according to claim 1, wherein the dynamic range mastering InfoFrame includes additional information of the EOTF according to the EOTF type information.

5. A video data processing device, a sink device which receives uncompressed video data, comprising:
a reception unit configured to receive the uncompressed video data and dynamic range mastering InfoFrame including dynamic range related information of the uncompressed video data from a source device which generates the uncompressed video data via an interface,
wherein the dynamic range mastering InfoFrame includes InfoFrame type code identifying a type of the dynamic range mastering InfoFrame, wherein the dynamic range mastering InfoFrame includes electro optical transfer function (EOTF) type information for identifying an EOTF used in the uncompressed video data, wherein the dynamic range mastering InfoFrame includes information indicating maximum brightness of the uncompressed video data; and a playback unit configured to play the received video data.

6. The video data processing device according to claim 5, the device further comprising:

transmitting unit configured to transmit extended display identification data (EDID) indicating capabilities of the sink device to the source device via an interface, wherein the EDID includes EOTF information for identifying EOTF supported by the sink device, wherein the dynamic range mastering InfoFrame is received when the EOTF information identifies at least one EOTF supported by the sink device, wherein the dynamic range mastering InfoFrame includes information indicating maximum brightness of a mastering display that was used in mastering the uncompressed video data and information indicating minimum brightness of the mastering display.

7. The video data processing device according to claim 5, wherein the dynamic range mastering InfoFrame includes chromaticity coordinate information of three primary colors and white color of a mastering display.

8. The video data processing device according to claim 5, wherein the dynamic range mastering InfoFrame includes additional information of the EOTF according to the EOTF type information.

9. A video data processing method, in a source device which generates uncompressed video data, comprising:

generating the uncompressed video data; and transmitting the uncompressed video data and dynamic range mastering InfoFrame including dynamic range related information of the uncompressed video data to a sink device which receives the uncompressed video data via an interface, wherein the dynamic range mastering InfoFrame includes InfoFrame type code identifying a type of the dynamic range mastering InfoFrame, wherein the dynamic range mastering InfoFrame includes electro optical transfer function (EOTF) type information for identifying an EOTF used in the uncompressed video data, wherein the dynamic range mastering InfoFrame includes information indicating maximum brightness of the uncompressed video data.

10. The video data processing method according to claim 9, the method further comprising:

receiving extended display identification data (EDID) indicating capabilities of the sink device from the sink device via an interface, wherein the EDID includes EOTF information for identifying EOTF supported by the sink device, wherein the dynamic range mastering InfoFrame is transmitted when the EOTF information identifies at least one EOTF supported by the sink device, wherein the dynamic range mastering InfoFrame includes information indicating maximum brightness of a mastering display that was used in mastering the uncompressed video data and information indicating minimum brightness of the mastering display.

11. The video data processing method according to claim 9, wherein the dynamic range mastering InfoFrame includes chromaticity coordinate information of three primary colors and white color of a mastering display.

12. The video data processing method according to claim 9, wherein the dynamic range mastering InfoFrame includes additional information of the EOTF according to the EOTF type information.

13. A video data processing device, a source device which generates uncompressed video data, comprising:

a generator configured to generate the uncompressed video data; and a transmission unit configured to transmit the uncompressed video data and dynamic range mastering InfoFrame including dynamic range related information of the uncompressed video data to a sink device which receives the uncompressed video data via an interface, wherein the dynamic range mastering InfoFrame includes InfoFrame type code identifying a type of the dynamic range mastering InfoFrame, wherein the dynamic range mastering InfoFrame includes electro optical transfer function (EOTF) type information for identifying an EOTF used in the uncompressed video data, wherein the dynamic range mastering InfoFrame includes information indicating maximum brightness of the uncompressed video data.

14. The video data processing device according to claim 13, the device further comprising:

receiving unit configured to receive extended display identification data (EDID) indicating capabilities of the sink device from the sink device via an interface, wherein the EDID includes EOTF information for identifying EOTF supported by the sink device, wherein the dynamic range mastering InfoFrame is transmitted when the EOTF information identifies at least one EOTF supported by the sink device, wherein the dynamic range mastering InfoFrame includes information indicating maximum brightness of a mastering display that was used in mastering the uncompressed video data and information indicating minimum brightness of the mastering display.

15. The video data processing device according to claim 13, wherein the dynamic range mastering InfoFrame includes chromaticity coordinate information of three primary colors and white color of a mastering display.

* * * * *